US012766657B1

(12) United States Patent
Cole

(10) Patent No.: US 12,766,657 B1

(45) Date of Patent: Oct. 20, 2026

(54) BLADE SHARPENING APPARATUS AND METHODS OF MAKING AND USING SAME

(71) Applicant: Andrew William Cole, Pefferlaw (CA)

(72) Inventor: Andrew William Cole, Pefferlaw (CA)

( * ) Notice: Subject to any disclaimer, the term of this patent is extended or adjusted under 35 U.S.C. 154(b) by 0 days.

(21) Appl. No.: 19/418,812

(22) Filed: Dec. 12, 2025

(51) Int. Cl.

| | |
|---|---|
| ***B24B 3/58*** | (2006.01) |
| ***B23D 63/00*** | (2006.01) |
| ***B23D 63/20*** | (2006.01) |
| ***B24B 27/00*** | (2006.01) |

(52) U.S. Cl.

CPC .......... *B24B 3/583* (2013.01); *B23D 63/0055* (2024.05); *B23D 63/201* (2013.01); *B24B 27/0069* (2013.01)

(58) Field of Classification Search

CPC .............. B23D 63/0055; B23D 63/201; B23D 63/001; B23D 63/12; B23D 63/206; B24B 3/56; B24B 3/58; B24B 3/583; B24B 3/586; B24B 17/02; B24B 17/021; B24B 27/0069

USPC ....... 451/13, 16, 18, 23, 237, 238, 281, 293, 451/403; 76/37, 50.2, 74, 75

See application file for complete search history.

(56) References Cited

U.S. PATENT DOCUMENTS 2,842,983 A * 7/1958 Renie .................... B23D 63/12 76/41

2,935,903 A * 5/1960 Gavin .................... B23D 63/10 76/29

5,333,518 A * 8/1994 Shriver .................. B23D 63/12 76/40

5,503,046 A * 4/1996 Emter .................. B23D 63/005 76/43

7,114,413 B1 * 10/2006 Behan .................... B23D 63/12 76/89

10,315,260 B2 * 6/2019 Belzile ................. B23D 63/201

11,691,209 B2 * 7/2023 Birker .................... B23D 63/02 76/58

2006/0086208 A1 * 4/2006 Gschwind, Sr. ....... B23D 63/02 76/58

FOREIGN PATENT DOCUMENTS

WO WO-8911937 A1 * 12/1989 ............. B24B 3/583

* cited by examiner

*Primary Examiner* — Brian D Keller

*Assistant Examiner* — Marcel T Dion

(74) *Attorney, Agent, or Firm* — Own Innovation; James W. Hinton; Daniel Biggs

(57) ABSTRACT

An apparatus for grinding a blade comprising a plurality of teeth and setting the blade by providing an offset to the plurality of teeth, a method of grinding the blade, and a method of assembling the apparatus are provided. The apparatus includes a grinding wheel for grinding the blade, a plurality of clamping jaws for securely holding the blade as the grinding wheel is moved along a profile thereof responsive to an actuation input, an input shaft for receiving the actuation input, first and second bending cams configured to be actuated by a camshaft, and first and second levers configured to be bent by the first and second bending cams, respectively, and further configured to pivot about respective pivot points to provide the offset by selectively setting each tooth inwards or outwards according to a predefined pattern.

15 Claims, 20 Drawing Sheets

BLADE SHARPENING APPARATUS AND METHODS OF MAKING AND USING SAME

TECHNICAL FIELD

The following relates generally to sharpening band saw blades, and more particularly to sharpening band saw blades and adjusting the set of the teeth of band saw blades in a single pass using a single apparatus.

Introduction

When a saw blade that is used on a lumber mill that cuts logs into boards becomes dull and the set wears off the blade, the blade may become stuck in the kerf slot and stall the motor on the sawmill. The "set" refers to the teeth being offset to the inside and outside of the blade to create a cut wider than the blade. "Kerf" is the width of slot that the blade cuts in the wood, e.g., a 0.042" thick blade with 0.022" set on each side of the blade would cut a slot 0.086" wide.

Conventional sharpening apparatus push the blade of the saw under a sharpening wheel and lift the blade up while moving the blade forward through the apparatus. Such conventional sharpening apparatus do not include offsetting functionality.

Such conventional sharpening apparatus do not allow for sharpening the teeth according to a predefined or custom pattern, e.g., selecting a particular angle to which the teeth are to be ground (e.g., according to the type of wood to be cut by the saw blade).

Conventional offsetting apparatus do not include sharpening functionality.

Accordingly, there is a need for systems and methods that overcome at least some of the foregoing disadvantages.

SUMMARY

An apparatus for grinding a blade including a plurality of teeth and setting the blade by providing an offset to the plurality of teeth is provided. The apparatus includes a grinding wheel for grinding the blade, a plurality of clamping jaws for securely holding the blade as the grinding wheel is moved along a profile thereof responsive to an actuation input, an input shaft for receiving the actuation input, first and second bending cams configured to be actuated by a camshaft, and first and second levers configured to be bent by the first and second bending cams, respectively, and further configured to pivot about respective pivot points to provide the offset by selectively setting each tooth inwards or outwards or leaving the tooth in place according to a setting pattern.

The apparatus may further include a pawl mechanically connected to the input shaft for engaging each tooth to advance the blade one tooth at a time, the pawl configured to feed and release the blade as the input shaft receives the actuation input, thereby selectively permitting the blade to advance through the apparatus by lifting up over each tooth and dropping into a gullet of a subsequent tooth.

The apparatus may further include an upper crank arm for engaging with the pawl to move the pawl along the blade, and a lower crank arm connected to the upper crank arm and in communication with a rotating plate for receiving rotation from the camshaft.

The apparatus may further include a tracer arm shaft for enabling tracing out a predefined grinding pattern by communicating with the pattern, the tracer arm shaft having a radially slotted arm rigidly attached thereto for engaging with a double-ended stylus, the double-ended stylus attached to a tracer arm for following the predefined grinding pattern including tracing out the predefined grinding pattern with the opposite end of the stylus.

The apparatus may further include an upright to which the tracer arm is hingedly attached mounted on a linear rail bearing for guiding movement of the tracer arm, and a top arm attached to a grinding head housing the grinding wheel and disposed at a top portion of the upright at a hinged joint. As the tracer arm follows the predefined grinding pattern, the top arm may be configured to follow the predefined grinding pattern.

The apparatus may further include a chain for connecting the input shaft, at a roller chain sprocket thereof, the tracer arm, at a tracer sprocket thereof, and the camshaft, at a camshaft sprocket thereof, the roller chain sprocket configured, upon receiving the actuation input via the input shaft, to drive the tracer arm and the camshaft. The apparatus may further include a depth adjustment rod for connecting and separating the grinding head from the tracer arm to keep the tracer arm and the grinding head mutually synchronized.

The apparatus may further include first and second precision guide blocks respectively including first and second dies for pushing against the plurality of teeth to provide the offset, and the first and second levers may be configured to push against the first and second dies, respectively.

The first and second levers may respectively include first and second adjustable pins protruding therefrom and configured to work on an arc to provide the offset.

The apparatus may first grind each tooth and may then set the ground tooth according to the setting pattern.

The setting pattern may instruct, for every group of three teeth of the plurality of teeth, to set the first tooth inwards, to set the second tooth outwards, and not to set the third tooth.

A method of grinding a blade including a plurality of teeth and setting the blade by providing an offset to the plurality of teeth is provided. The method includes securely holding the blade as a grinding wheel is moved along a profile thereof responsive to an actuation input received via an input shaft, respectively bending, via first and second banding cams actuated by a camshaft, first and second levers configured to pivot about respective pivot points to provide the offset by selectively setting each tooth inwards or outwards or leaving the tooth in place according to a setting pattern, and grinding the teeth at a grinding wheel.

The method may further include engaging each tooth, at a pawl mechanically connected to the input shaft, to advance the blade one tooth at a time, the pawl configured to feed and release the blade as the input shaft receives the actuation input, thereby selectively permitting the blade to advance by lifting up over each tooth and dropping into a gullet of a subsequent tooth.

The method may further include engaging with the pawl, at an upper crank arm, to move the pawl along the blade, and the upper crank arm may be connected to a lower crank arm in communication with a rotating plate for receiving rotation from the camshaft.

The method may further include enabling, at a tracer arm shaft, tracing out a predefined grinding pattern by communicating with the predefined grinding pattern, the tracer arm shaft having a radially slotted arm rigidly attached thereto for engaging with a double-ended stylus, the double-ended stylus attached to a tracer arm for following the predefined grinding pattern including tracing out the predefined grinding pattern with the opposite end of the stylus.

The tracer arm may be hingedly attached to an upright mounted on a linear rail bearing for guiding movement of the tracer arm, and as the tracer arm follows the predefined grinding pattern, a top arm may be configured to follow the predefined grinding pattern, the top arm attached to a grinding head housing the grinding wheel and disposed at a top portion of the upright at a hinged joint.

The input shaft may be connected via a chain, at a roller chain sprocket of the input shaft, to the tracer arm, at a tracer sprocket thereof, and to the camshaft, at a camshaft sprocket thereof, and the roller chain sprocket may be configured, upon receiving the actuation input via the input shaft, to drive the tracer arm and the grinding head. The tracer arm and the grinding head may be mutually synchronized via a depth adjustment rod for connecting and separating the grinding head from the tracer arm.

The method may further include pushing against the plurality of teeth to provide the offset, the pushing occurring via first and second precision guide blocks respectively including first and second dies, and the first and second levers may be configured to push against the first and second dies, respectively.

The first and second levers may respectively include first and second adjustable pins protruding therefrom and configured to work on an arc to provide the offset.

Grinding the teeth may occur prior to providing the offset.

The setting pattern may instruct, for every group of three teeth of the plurality of teeth, to set the first tooth inwards, to set the second tooth outwards, and not to set the third tooth.

A method of assembling an apparatus for grinding a blade including a plurality of teeth and for setting the blade by providing an offset to the plurality of teeth is provided. The method includes providing a grinding head including a grinding wheel for grinding the blade, disposing below the grinding wheel a plurality of clamping jaws for securely holding the blade as the grinding wheel is moved along a profile thereof responsive to an actuation input, providing first and second bending cams configured to be actuated by a camshaft, providing first and second levers configured to be bent by the first and second bending cams, respectively, and further configured to pivot about respective pivot points to provide the offset by selectively setting each tooth inwards or outwards or leaving the tooth in place according to a setting pattern, providing an input shaft for receiving the actuation input, the input shaft including a roller chain sprocket, a camshaft for actuating the first and second bending cams, the camshaft including a camshaft sprocket, and a tracer arm including a tracer sprocket, connecting, via a chain, the input shaft at the roller chain sprocket with the tracer arm at the tracer sprocket and the camshaft at the camshaft sprocket thereof, the roller chain sprocket configured, upon receiving the actuation input via the input shaft, to drive the tracer arm and the camshaft, providing a tracer arm shaft for enabling tracing out a predefined grinding pattern by communicating with the predefined grinding pattern, the tracer arm shaft having a radially slotted arm rigidly attached thereto for engaging with a double-ended stylus, the double-ended stylus attached to a tracer arm for following the predefined grinding pattern including tracing out the predefined grinding pattern with the opposite end of the stylus, providing an upright to which the tracer arm is hingedly attached, the upright mounted on a linear rail bearing for guiding movement of the tracer arm, and a top arm attached to the grinding head and disposed at a top portion of the upright at a hinged joint. As the tracer arm follows the predefined grinding pattern, the top arm is configured to follow the predefined grinding pattern. The method further includes providing a depth adjustment rod for connecting and separating the grinding head from the tracer arm to keep the tracer arm and the grinding head mutually synchronized, providing a pawl mechanically connected to the input shaft for engaging each tooth to advance the blade one tooth at a time, the pawl configured to feed and release the blade as the input shaft receives the actuation input, thereby selectively permitting the blade to advance through the apparatus by lifting up over each tooth and dropping into a gullet of a subsequent tooth, providing an upper crank arm for engaging with the pawl to move the pawl along the blade and a lower crank arm connected to the upper crank arm and in communication with a rotating plate for receiving rotation from the camshaft, and providing first and second precision guide blocks respectively including first and second dies for pushing against the plurality of teeth to provide the offset, the first and second levers configured to push against the first and second dies, respectively, or providing first and second adjustable pins protruding from the first and second pins, respectively, and configured to work on an arc to provide the offset.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1A:
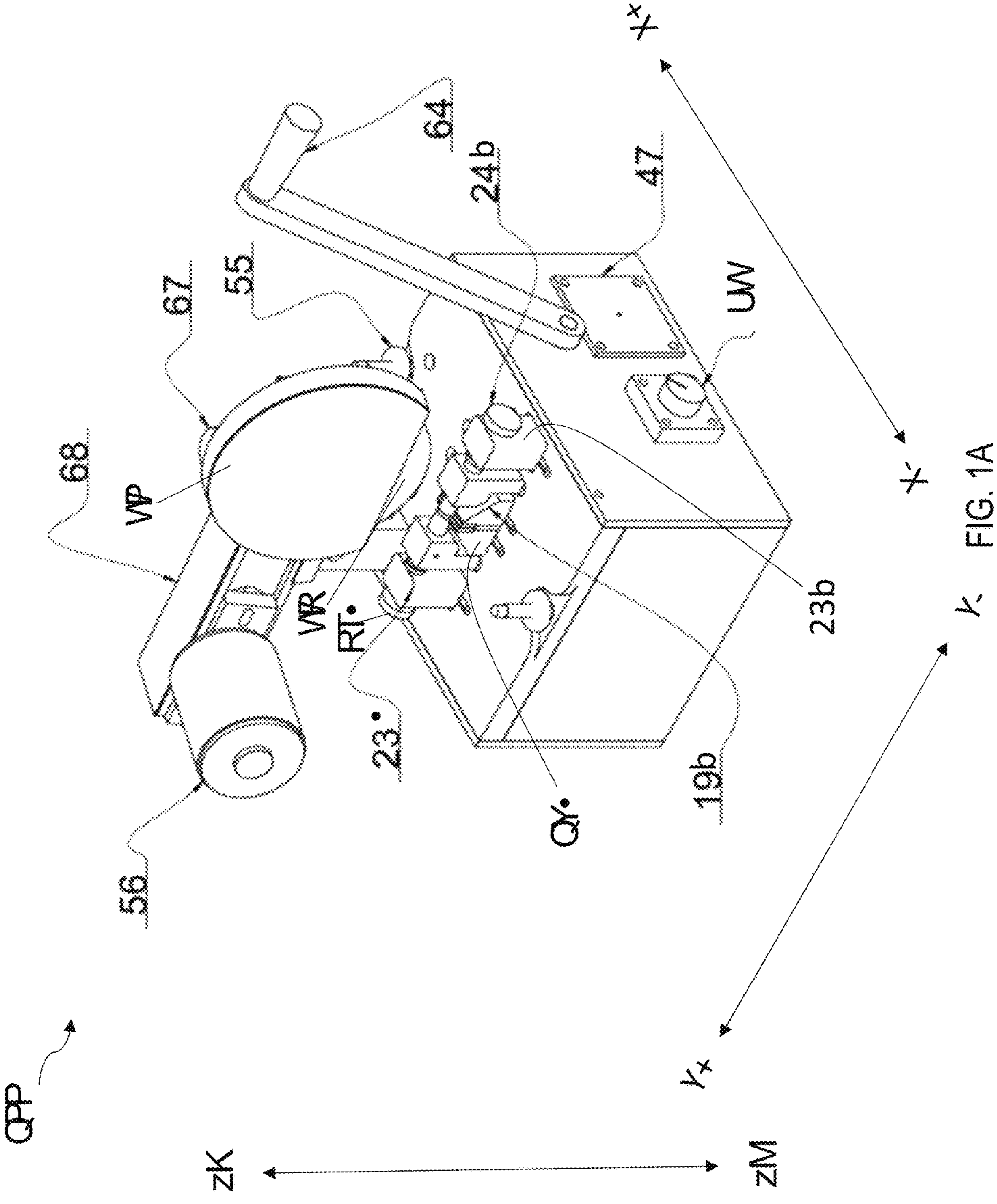
FIG. 1A is a front perspective view of a blade sharpening apparatus, according to an embodiment.
Figure 1B:
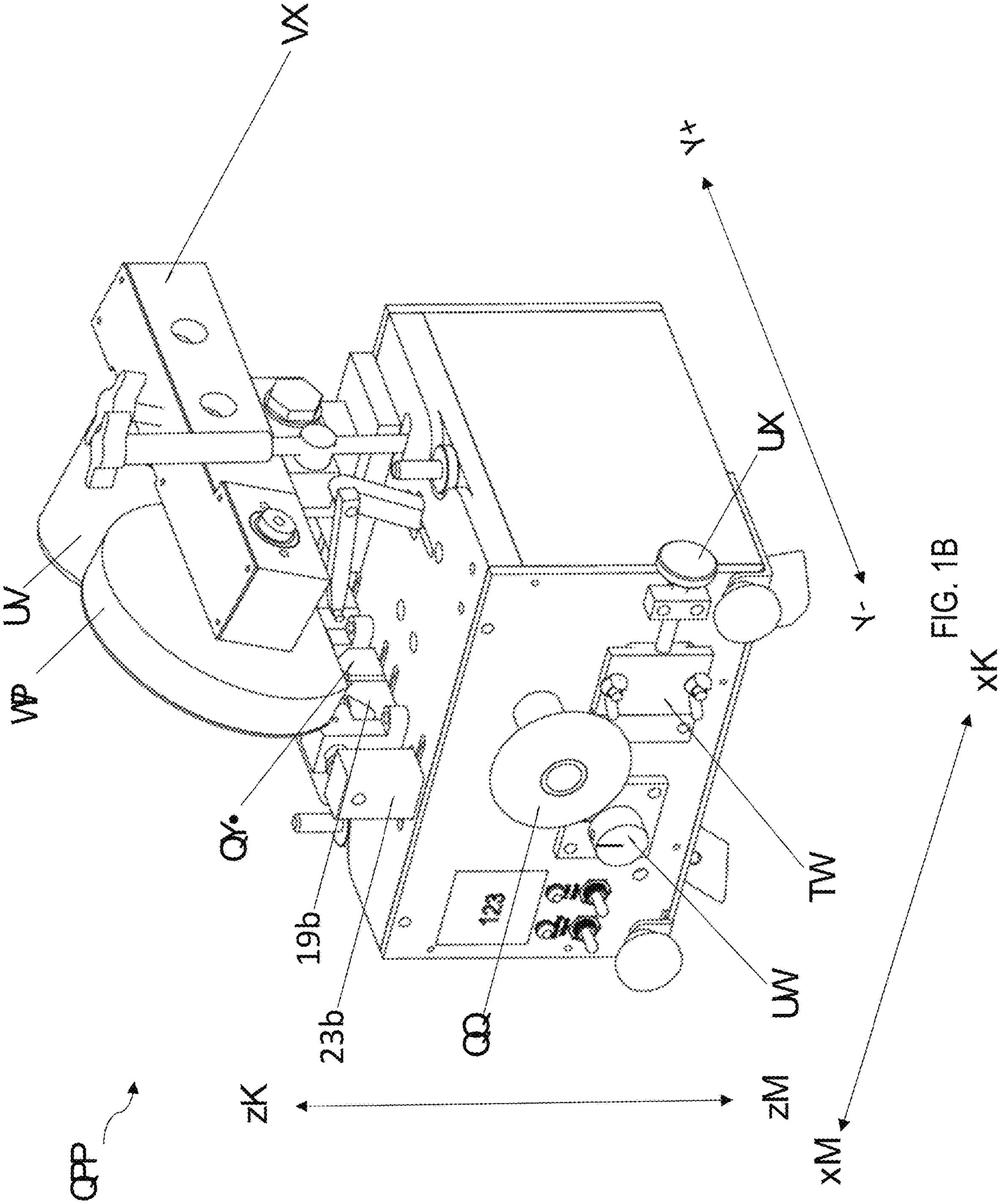
FIG. 1B is a back perspective view of the blade sharpening apparatus of FIG. 1A.
Figure 1C:
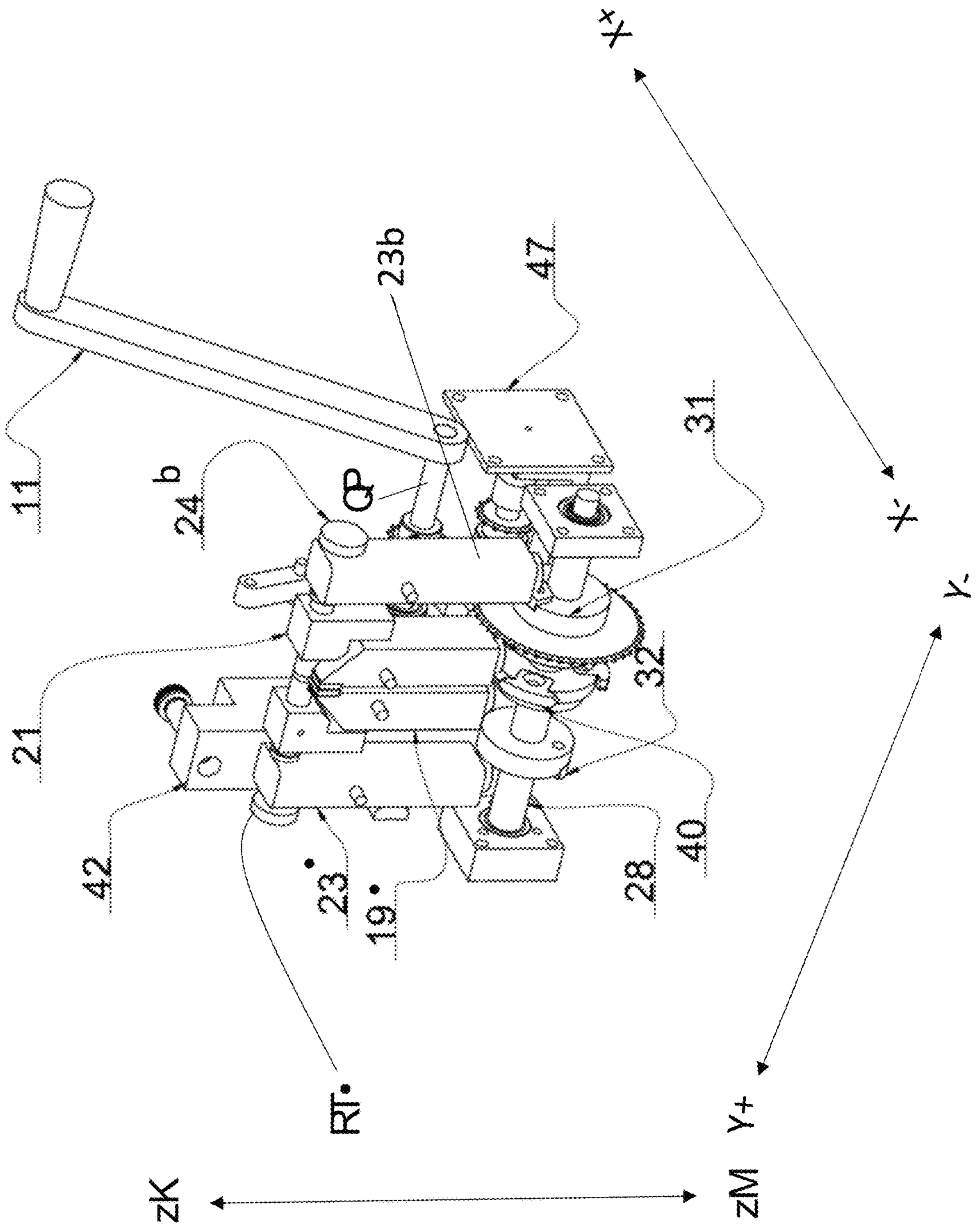
FIG. 1C is a front perspective sectional view of the blade sharpening apparatus of FIG. 1A.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Throughout the present disclosure, where the term "sawblade" or "saw blade" is used, these terms are to be understood as referring to band saws.

Throughout the present disclosure, setting a blade is to be understood as setting the teeth of the blade.

The following relates generally to sharpening band saw blades, and more particularly to sharpening band saw blades and adjusting the set of the teeth of band saw blades in a single pass using a single apparatus.

In a preferred embodiment, the disclosure relates to grinding and setting blades 1" to 1½" wide with pitches from ¾" to 1" with standard raker set. A standard raker set is a repetitive pattern of one tooth set to the right, the next tooth set to the left, and the third tooth straight with no offset. The teeth have a thickness of 0.035" to 0.048" thickness. It will be appreciated that, when the terms 'left' and 'right' are used relative to the length of the blade, 'left' refers to the 'positive Y' or 'Y+' direction as provided by coordinate axes in the Figures, and 'right' refers to the 'negative Y' or 'Y−' direction.

More generally, movement along one of the labelled coordinate axes X, Y, Z is referred to as X+ or X−, Y+ or Y−, Z+ or Z−, according to the labelled Figures.

In the present disclosure, a tracer-type mechanism follows the exact profile of a changeable insert or pattern for different or custom profiles of the blade.

The blade is clamped in place when grinding and setting according to precision bending dies, and sharpening and setting are performed simultaneously.

Manual and automatic operation are both possible depending on end user configuration.

In a preferred embodiment, the grinding wheel for sharpening is made of steel with a cubic boron nitride (CBN) coating disposed about the periphery of the wheel, has a precision spindle, and uses 12 volt dc power.

The apparatus advantageously has a compact design.

The following relates to an apparatus including a frame with a guide to align the blade with respect to the grinding wheel and clamping jaws that hold the blade secure as the grinding wheel is moved along the profile of the saw tooth as the hand crank is turned. As the grinding occurs, a secondary mechanism offsets the previous tooth ground to achieve the correct set for the for the kerf width of the blade (e.g., according to a raker set). A pawl is mechanically connected to the hand crank that engages with the tooth to advance the blade to the next tooth after the grinding and setting has been completed. The foregoing is repeated until the entire blade has been ground and set. The frame for blade alignment further includes height screws that raise or lower the blade for bend location, thereby keeping the blade straight through the apparatus and allowing the blade to circle around the back.

The following relates to restoring the original tooth profile, sharpness, and offset of the teeth of band saw blades in one pass over the blade as opposed to using two separate machines and turning the blade inside out to set the teeth in opposite directions with mechanical advantage. The present disclosure may advantageously reduce operator fatigue and force required and complete the task in a shorter timeframe.

In a preferred embodiment, a precision guide block with the die pushes straight in against the teeth of the blade to provide the offset, with a lever pushing the die. In an alternate embodiment, no guide block is provided, and the lever has an adjustable pin protruding therefrom and works on an arc (instead of a 90 degree angle as in the preferred embodiment).

In a preferred embodiment, as shown in the Figures, although the apparatus grinds and sets the teeth in a single pass of the sawblade through the apparatus, the apparatus is considered to grind the teeth first and then set the teeth. When the blade is disposed in the machine for grinding and setting, the blade is disposed according to a position indicator. Generally a straight tooth (to be sharpened but not offset) is disposed in the clamping or bending area of the apparatus, thereby allowing a first offset tooth to be sharpened and advanced to the bending area on the next cycle, each cycle corresponding to one turn of an input shaft as further discussed herein.

In an alternate embodiment, the apparatus is configured to set the teeth first and then grind (i.e., sharpen) the teeth. In the alternate embodiment, many components as shown in the Figures would remain the same but may be disposed differently within the apparatus, and some parts may be changed slightly.

Throughout the following, the terms "grind", "ground", and other conjugations, declensions, and grammatical equivalents of same are used interchangeably with the term "sharpen" and other conjugations, declensions, and grammatical equivalents of same to refer to sharpening teeth through grinding as in the present disclosure.

Throughout the following, the term "single pass" may be understood to describe a sawblade passing or travelling though the disclosed apparatus from a start point (usually the weld on the blade) back around to the same point one time.

Referring now to FIGS. 1A-1D, shown therein are a front perspective view, a back perspective view, a front perspective sectional view, and a front view, respectively, of a blade sharpening apparatus 100, according to an embodiment. In the interest of clarity, some components are labelled only once across FIGS. 1A-1D.

The apparatus 100 includes levers 23*a*, 23*b* (collectively referred to as the levers 23 and generically as the lever 23) for respectively manipulating dies 22*a*, 22*b* (collectively referred to as the dies 22 and generically as the die 22), the levers 23 being actuated via an input shaft 10. The input shaft 10 is actuated by a hand crank 11. It will be appreciated that the hand crank 11 may be replaced by any other suitable component for mechanical actuation (e.g., a handwheel for manual operation, a component that automatically actuates the levers 23 such as an electric drive motor).

The dies 22 may be stored in a housing that is at 90 degrees relative to a blade 102.

The apparatus 100 may provide for manual, automatic, or single step control of the movement of the sawblade 102 through the apparatus 100.

The levers 23 are actuated by bending cams 32, 33 on a camshaft 28 that is rotated by an input shaft 10 (as further discussed with respect to FIGS. 2A-2B) at a ratio of 1 turn of the input shaft 10 to ⅓ turn of the camshaft 28, pushing the bottom of the lever 23 away from the cams 32, 33, respectively as the lever 23 pivots on a hinge point or pivot point 25. The foregoing allows the top of the lever 23, with bend adjust screws 24 to push on an end of a bend pin 27, extending the lever 23 from the housing 21 and towards a tooth 8, continuing to push the tooth 8 over to achieve the desired set.

Figure 1D:
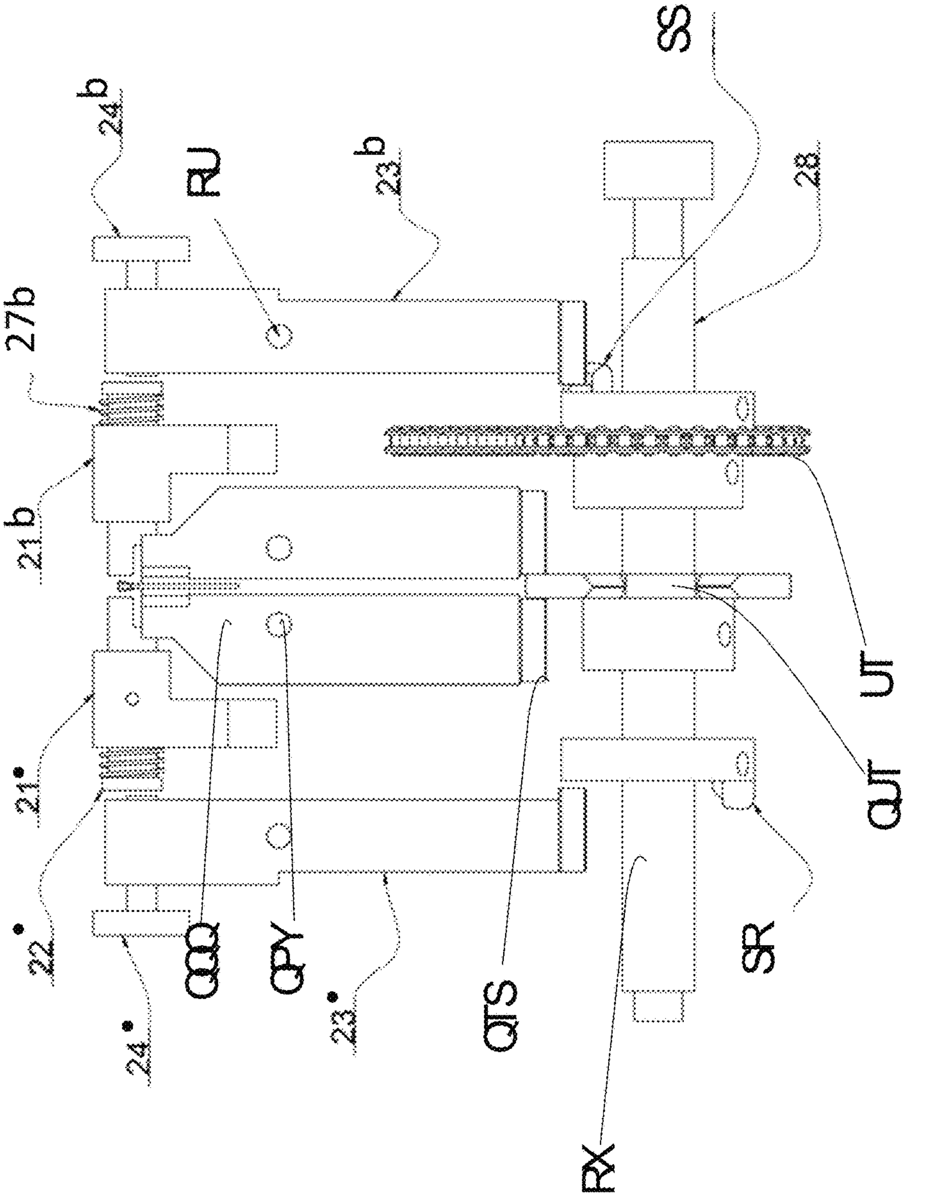
FIG. 1D is a front sectional view of the blade sharpening apparatus of FIG. 1A.

FIG. 1D shows bend pins 27*a*, 27*b* of which only the bend pin 27*b* is labelled for clarity.

The apparatus 100 further includes a grinding head 70 having a grinding wheel 72 disposed therein for sharpening the teeth of a saw blade when received by the apparatus 100.

In a preferred embodiment, the grinding wheel 72 is or is made of cubic boron nitride, which may advantageously never wear down and in which the profile may advantageously stay true. Other suitable materials may be used for the grinding wheel 72, e.g., diamond.

The grinding head 70 includes a spindle (not shown) with the wheel 72 mounted thereto. The grinding head 70 further includes a motor 56 connected to a drive belt 88 connected to the spindle via a spindle shaft 97. The grinding wheel 72 may be directly mounted to the motor 56 without using a spindle, but it is preferred that a spindle be used for greater accuracy.

The grinding head 70 further includes an adjusting screw 67 for adjusting the grinding head up or down (i.e., in the Z+ or Z− directions) relative to the blade 102, which has the effect of adjusting the depth of material to be removed from a gullet and back of each tooth 8 (see discussion of FIGS. 6A-6B) . . . . The grinding head 70 further includes a bottom stop 55 for adjusting the bottom of the gullet to the preferred height in clamping jaws 59 as shown in FIG. 3C, where several of the components are shown mounted to a base plate 1.

The depth of material to be removed from each tooth 8 may be further adjusted according to a depth adjustment rod 51 pivoting nuts 61 and differential of threads for fine adjustment (not shown).

The material to be removed from the face 82 of each tooth 8 may be further adjusted via a face cut adjust screw 58.

As the saw blade is received at the apparatus 100, movement of the levers 23 to manipulate the dies 22 causes the dies 22 to press on the teeth 8, thereby advancing the teeth 8 towards the grinding wheel 72 and sharpening the teeth of the saw blade, and alternately insets, leaves in place, and outsets the teeth of the saw blade, i.e., all teeth are sharpened by the grinding wheel 72 and, for every set of three teeth, one is inset, one is not set, and one is outset by the dies 22.

The apparatus 100 further includes housings 21*a*, 21*b* for housing the bend pins 27.

The apparatus 100 further includes the adjustment screws 24*a*, 24*b* for respectively adjusting the levers 23*a*, 23*b*. The adjustment screws 24*a*, 24*b* respectively pass through the levers 23*a*, 23*b* and are configured to adjust how far each lever 23 insets or offsets each tooth of the saw blade.

The apparatus 100 further includes clamping levers 19*a*, 19*b* (collectively referred to as the clamping levers 19 and generically referred to as the clamping lever 19) for retaining the saw blade within the apparatus 100 as the teeth are sharpened and inset or offset, i.e., the clamping levers 19 prevent movement of the saw blade other than passing through the apparatus 100.

Figure 2A:
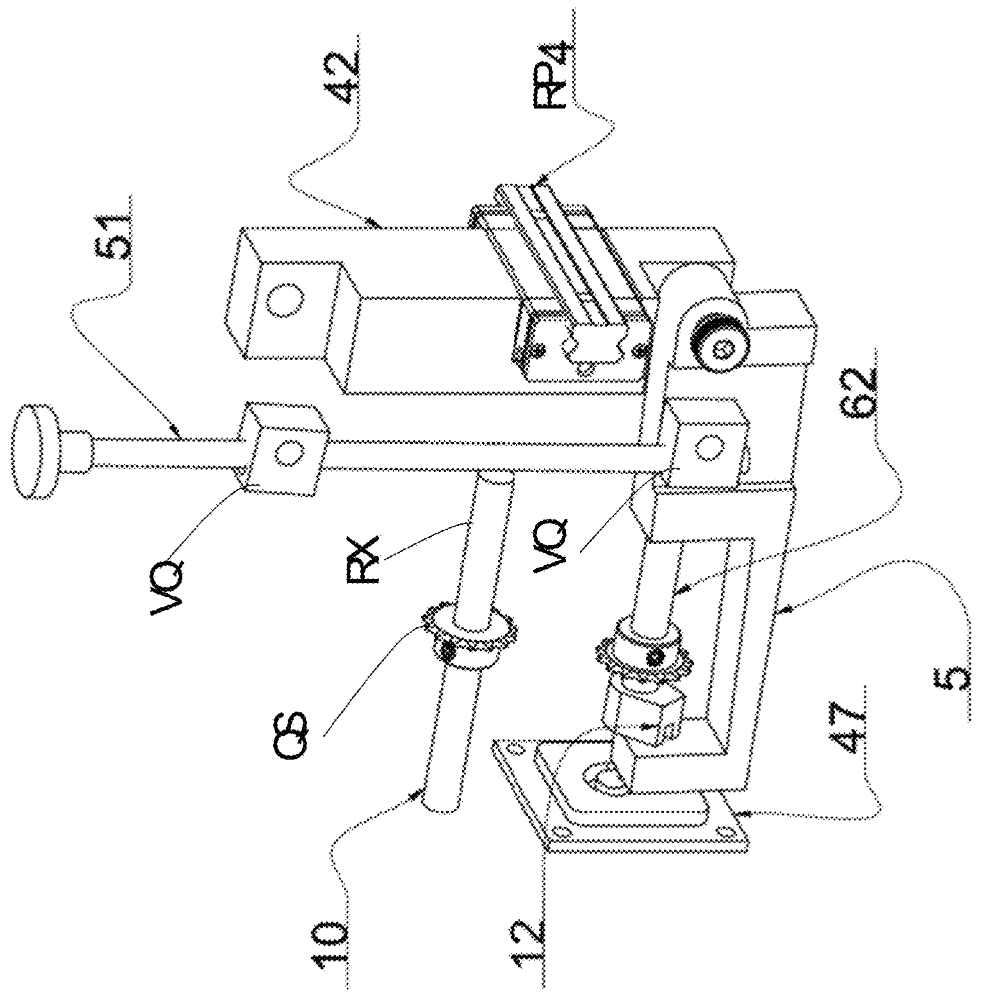
FIG. 2A is a sectional view of a plurality of shafts of the blade sharpening apparatus of FIG. 1A, according to an embodiment.
Figure 2B:
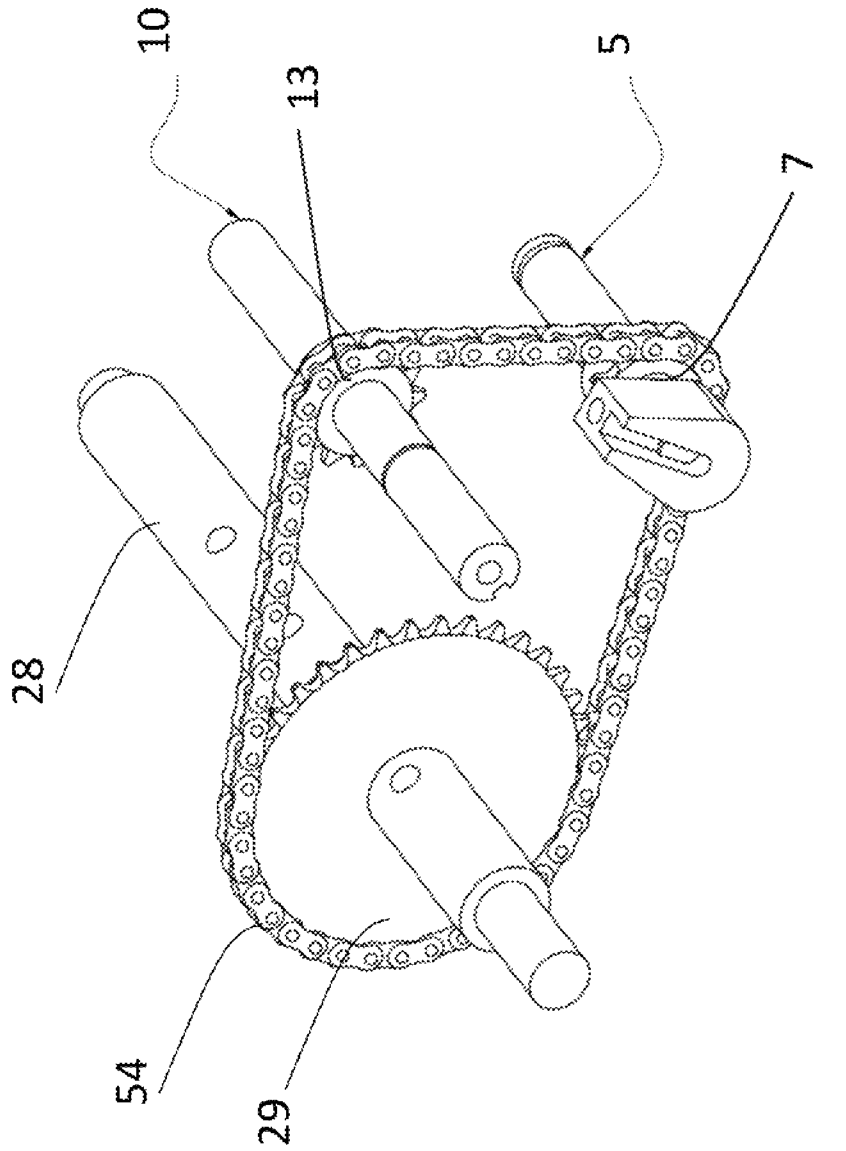
FIG. 2B is a simplified diagram of the some of the shafts of FIG. 2A.

The apparatus 100 further includes a chain 54 for connecting the input shaft 10 and the camshaft 28, as will be further described with respect to FIGS. 2A-2B. the chain 54 keeps operations synchronized with respect to time.

The apparatus 100 further includes a clamp lever 111 and a clamp lever pivot pin 109 about which the clamp lever 111 is pivoted (only one instance of each component is labelled for clarity).

The apparatus 100 further includes a clamping wheel 154 for retaining the blade 8 in place and a ball bearing 143 for making contact with the clamping wheel 154.

Figure 1E:
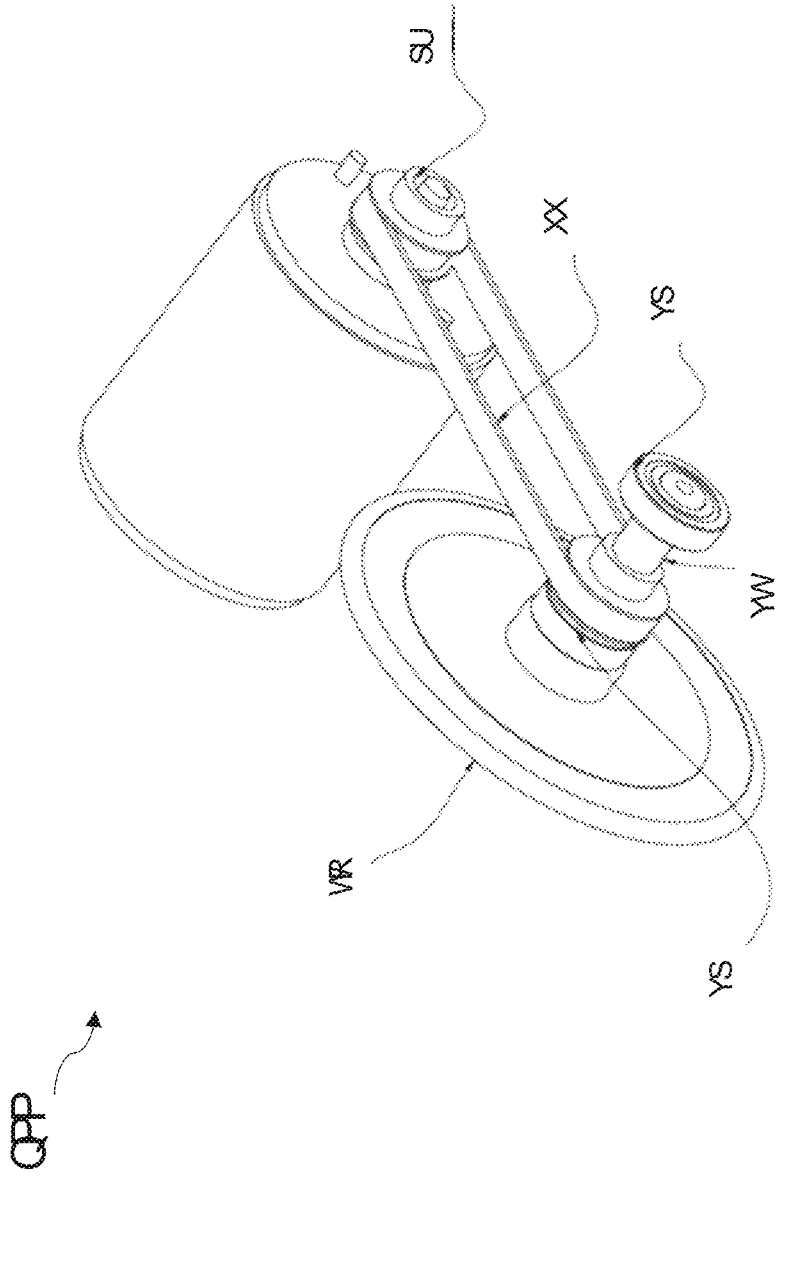
FIG. 1E is a perspective view of the blade sharpening apparatus of FIG. 1A with the housing removed to show internal features.

Referring now to FIG. 1E, shown herein is a perspective view of the blade sharpening apparatus 100 with the housing removed to show internal features.

Figure 7:
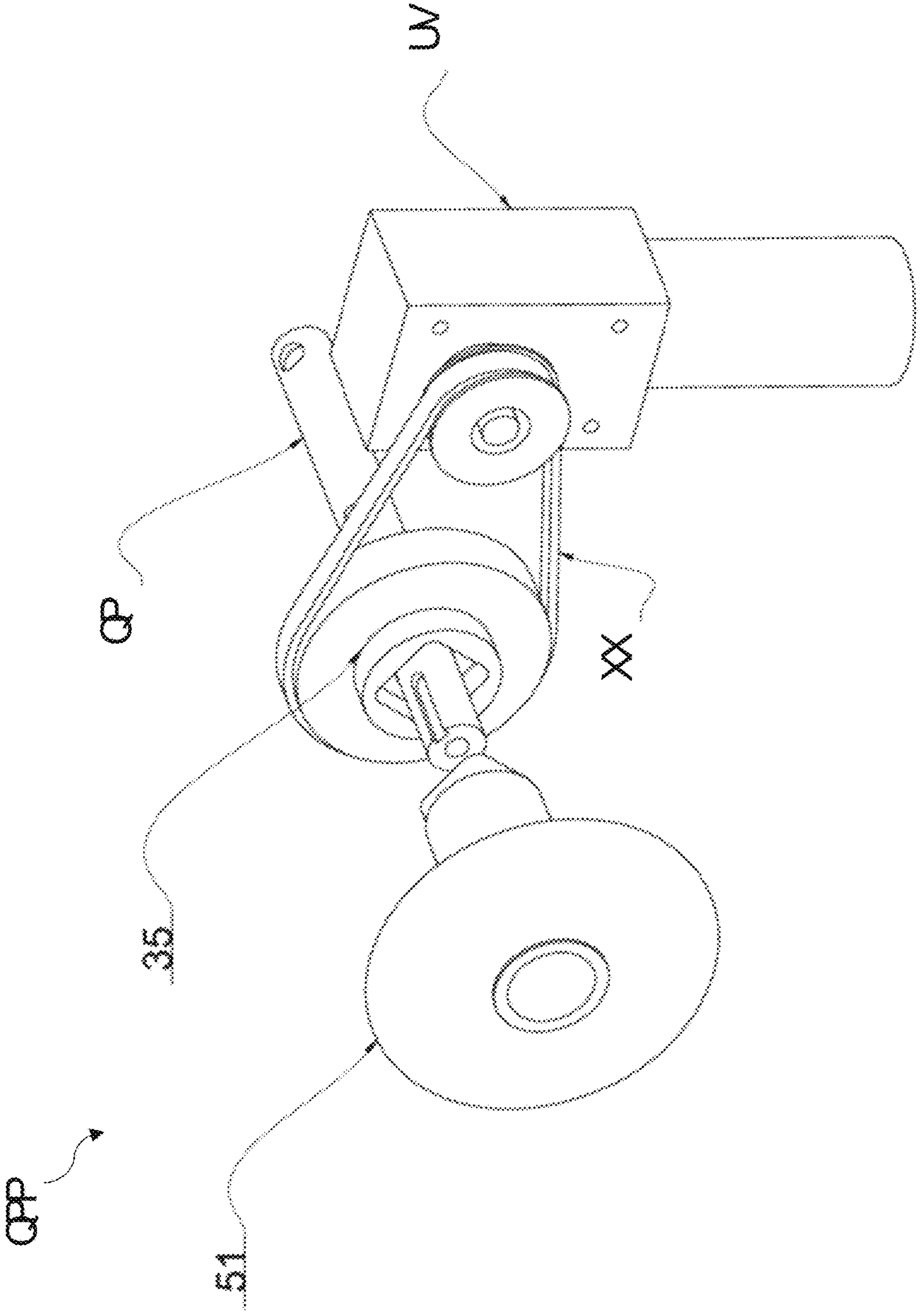
FIG. 7 is a perspective view of a portion of the apparatus of FIG. 1A for receiving input.

The apparatus 100 further includes a driven pulley 35 for allowing the input shaft 10 to be turned by the drive motor 56 via a drive belt 88 (see FIG. 7).

The apparatus 100 further includes bearings 93 for guiding movement of the components.

Referring now to FIGS. 2A-2B, the hand crank 11 is attached to an input shaft 10 supported in a housing 14. The input shaft 10 has a roller chain sprocket 13 that drives a tracer arm 5, at a tracer sprocket 7 thereof, connected thereto at a ratio of 1:1 and further drives a camshaft 28 via a camshaft sprocket 29.

The input shaft 10, the tracer arm 5, and the camshaft 28 are connected via a chain 54 at the roller chain sprocket 13, the tracer sprocket 7, and the camshaft sprocket 29, respectively.

In a preferred embodiment, the ratio is 3:1 (three turns of the input shaft 10 for one turn of the camshaft 28) to accommodate the standard raker set. In order to achieve this ratio, 10 teeth are provided on each of the roller chain sprocket 13 and the tracer sprocket 7, and 30 teeth are provided on the camshaft sprocket 29. Accordingly, the first turn of the input shaft 10 grinds a tooth but does not set the tooth, the second turn grinds the tooth and sets the tooth inward, and the third turn grinds the tooth and sets the tooth outwards relative to the length of the saw received at the apparatus 100.

Referring back to FIGS. 1A-1D, the apparatus 100 further includes ramps 40 for retaining the clamping levers 19 and the bending cams 32, 33 to push on the bending levers 23, thereby causing the setting of the teeth.

As the input shaft 10 turns the camshaft 28, the camshaft 28 causes the ramps 40 to close the clamping levers 19 holding the blade in position, and the bending cam 32 pushes on the bottom end of the bending levers 23 to bend the next tooth 8 inward. The bending lever 23 pivots so that a top end thereof pushes the outside bending die 22 to move inward (with respect to the actual saw blade). Accordingly, the tooth immediately adjacent the pushed outside bending die 22 is thereby bent inward over the bending die 22.

A depth adjustment rod 51 connects the tracer arm 5 to the grinding head 70 (at a mount thereof) to keep the tracer arm 5 and the grinding head 70 mutually in sync in the Z direction. The adjusting rod 51 adjusts depth of the gullet and the back of the tooth grind.

To bend the next tooth outward, as the input shaft 10 turns the camshaft 28, the bending cam 33 pushes on the bottom end of the bending levers 23 to bend the next tooth 8 outward. The bending lever 23 pivots so that a top end thereof pushes the outside bending die 22 to move outward (with respect to the actual saw blade). Accordingly, the tooth immediately adjacent the pushed outside bending die 22 is thereby bent outward over the bending die 22.

In other embodiments, the ratio may be different, and the number and pattern of teeth being ground or set varies or is selectable. For example, where it is desirable to have a saw where the teeth are all set inwards or outwards, all teeth may be so set (e.g., alternating between being set inwards and being set outwards). For example, where the setting of the teeth on the saw remains acceptable but the teeth are no longer sharp, all teeth may be sharpened but none set inwards or outwards (by backing off the bend adjust screws 24 so that the pins 27*a*, 27*b* do not make contact with the blade 102). For example, where the teeth 8 are acceptably sharp but not set correctly, all teeth 8 may be set (but not ground) by adjusting the grinding depth adjustment up (i.e., in the Z+ direction) and the face cut adjustment back via the adjustment screw 67.

Referring back to FIG. 2A, shown therein is a sectional view of the blade sharpening apparatus 100 of FIG. 1A.

The apparatus 100 further includes a tracer arm shaft 62 for enabling tracing out a pattern 47 (see FIG. 5A for more details) by communicating with the pattern 47 and enforcing the pattern 47. The tracer arm shaft 62 has a radially slotted arm 12 rigidly attached thereto for engaging with a double-ended stylus 63. The double-ended stylus 63 is attached to a tracer arm 5 for following the pattern 47 preinstalled on the apparatus 100 including tracing out the pattern 47 with the opposite end of the stylus 63.

Figure 6B:
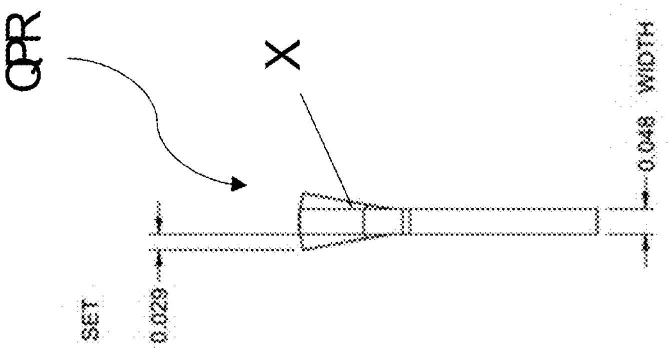
FIGS. 6A and 6B are side and front views, respectively, of the sawblade to be received, ground, and set by the apparatus of FIG. 1A.
Figure 6A:
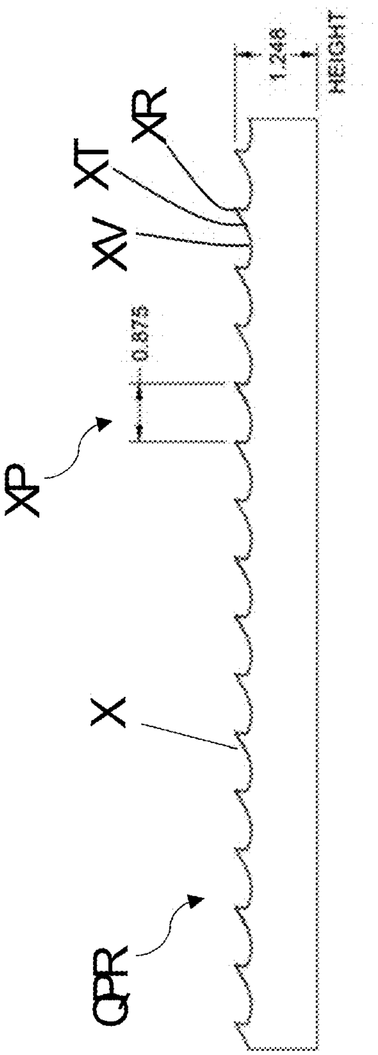

In an embodiment, the pattern 47 controls, the angles to which the teeth are ground or sharpened, i.e., the grind of the face 82 and the back 84 and the shape of the gullet 86 (see FIG. 6A).

In an embodiment, a one-dimensional pantograph is provided, and the pattern 47 is the one-dimensional pantograph. In an embodiment, a two-dimensional pantograph is provided, and the pattern 47 may be considered the "type" on the two-dimensional pantograph. While an ordinary pantograph may have the same ratio of reduction in both axes, the pattern 47 has a 1:1 ratio of reduction in the X direction and a 1:2 ratio of reduction in the Z direction.

The apparatus 100 further includes an upright 42, to which the tracer arm 5 is hingedly attached, mounted on a linear rail bearing 204 for guiding movement of the foregoing components along the "X" axis from the negative X or 'X−' direction to the positive X or 'X+' direction.

Referring back to FIG. 2B, the interrelationship of the components labelled therein may be relatively clearer.

Referring back to FIGS. 1A-1D, as the tracer arm 5 follows the pattern 47, a top arm 68, to which the grinding head 70 is attached, disposed at the top of the upright 42 at a hinged joint follows the same path as the tracer arm 5 (between X—and X+ and vice-versa, as well as between Z+ and Z—and vice-versa) due to the connecting link keeping the tracer arm 5 and top arm 68 in sync, creating a circular motion which moves the grinding wheel 72 along the blade profile of the saw and raises the saw up (Z+) to return to its starting position (the saw having moved up and down in the Z+ and Z− directions, respectively, during sharpening as the tooth being sharpened is pushed against the grinding wheel 72).

The apparatus 100 further includes a position indicator for indicating which tooth is currently being set (e.g., in a raker set, whether the current tooth is to be inset, outset, or not set).

The apparatus 100 may include an electronic tooth counter to cause the apparatus 100 to automatically shut down after reaching the end of the blade 102.

Figure 3B:
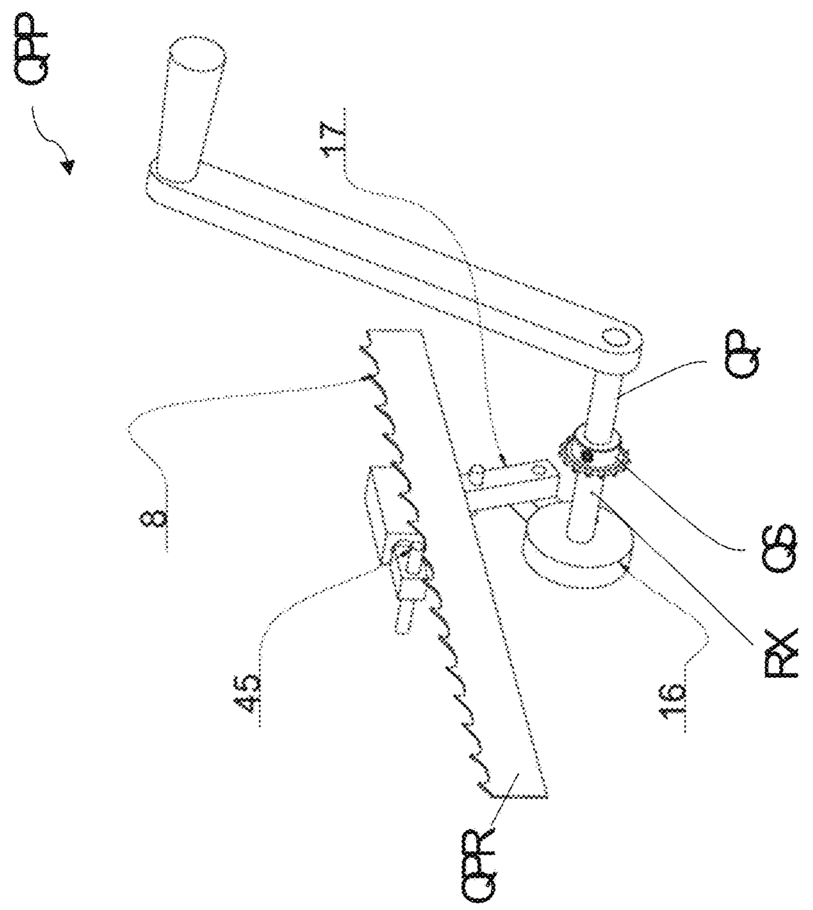
FIG. 3B is a perspective view of a sawblade passing through an inner portion of the apparatus of FIG. 1A, according to another embodiment.
Figure 3A:
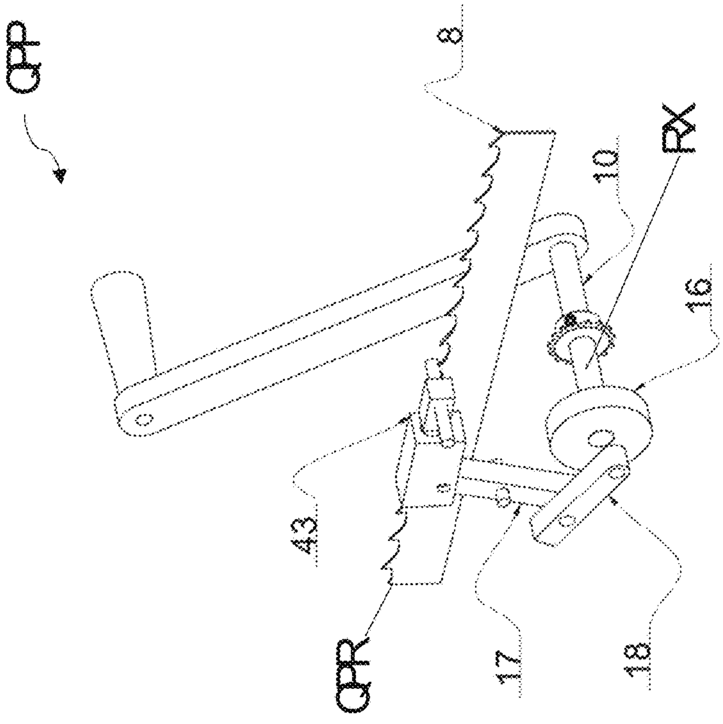
FIG. 3A is a perspective view of a sawblade passing through an inner portion of the apparatus of FIG. 1A, according to an embodiment.
Figure 3C:
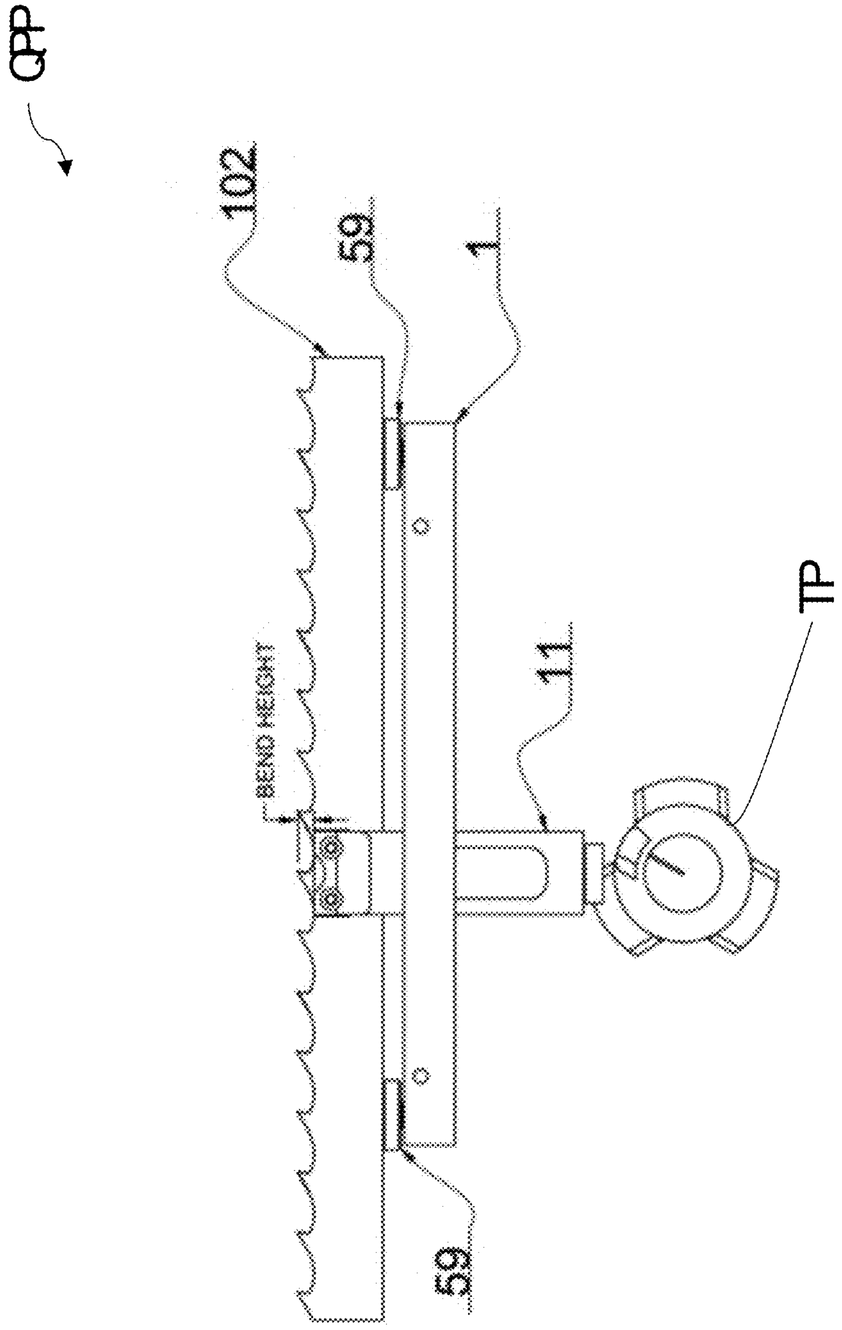
FIG. 3C is a side view of a sawblade passing through an inner portion of the apparatus of FIG. 1A, according to another embodiment.
Figure 3D:
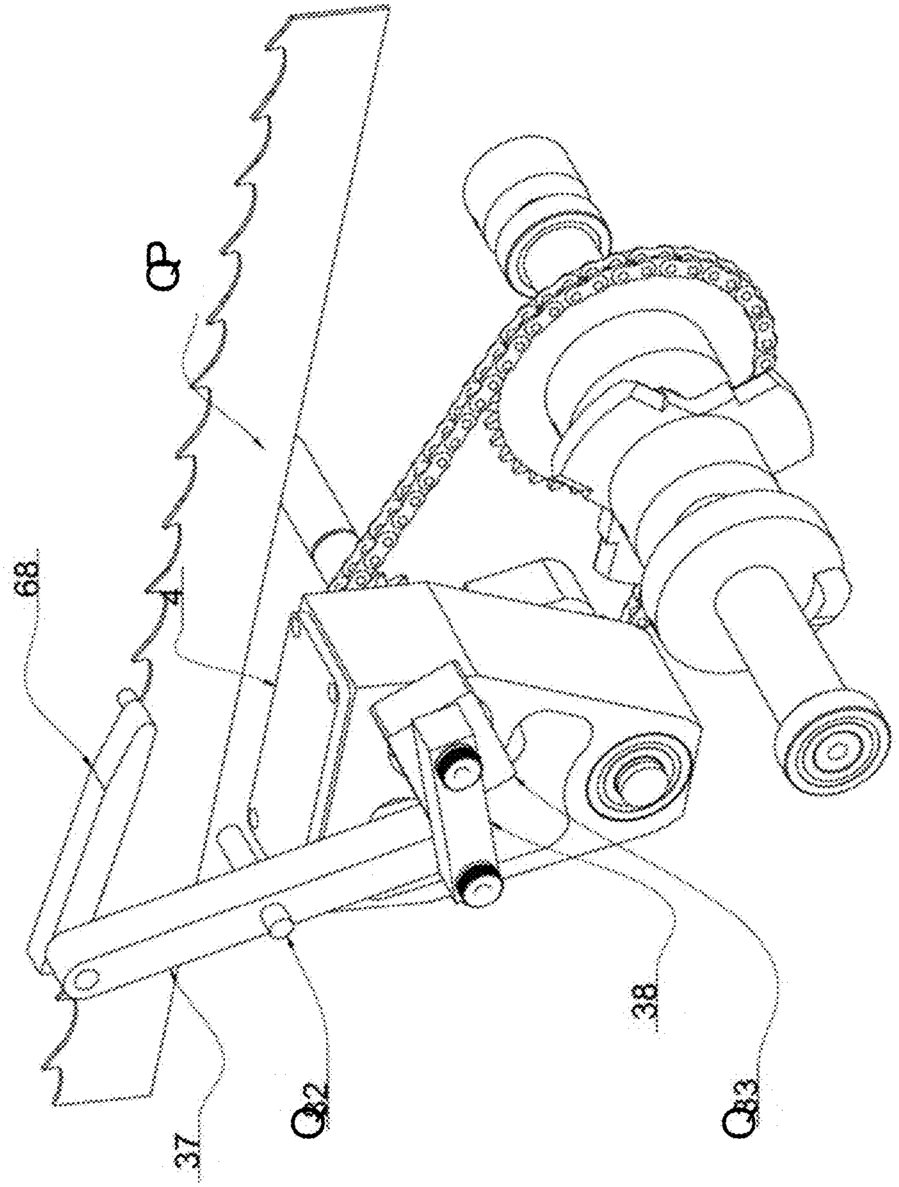
FIG. 3D is a perspective view of a sawblade passing through an inner portion of the apparatus of FIG. 1A, according to another embodiment.
Figure 3E:
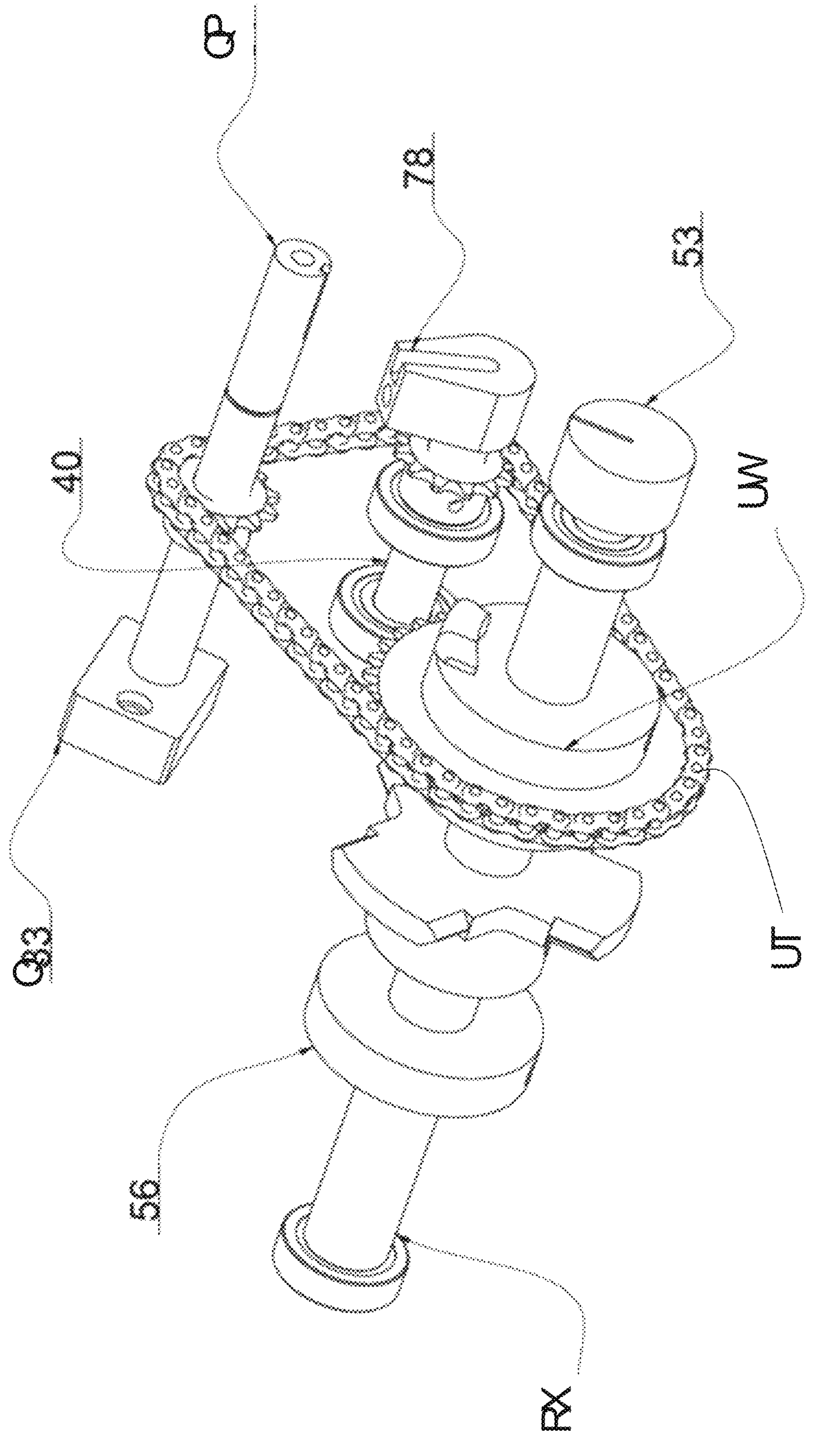
FIG. 3E is a perspective view of the inner portion of the apparatus of FIG. 3D shown at another angle.

Referring now to FIGS. 3A-3E, FIG. 3A is a perspective view of the sawblade 102 passing through an inner portion of the apparatus 100, according to an embodiment, FIG. 3B is a perspective view of the sawblade 102 passing through an inner portion of the apparatus 100, according to another embodiment, FIG. 3C is a side view of the sawblade 102 passing through an inner portion of the apparatus 100, according to another embodiment, FIG. 3D is a perspective view of the sawblade 102 passing through an inner portion of the apparatus 100, according to another embodiment, and FIG. 3E is a perspective view of the inner portion of the apparatus 100 shown at another angle.

The sawblade 102 includes a plurality of teeth (the teeth 8) to be sharpened and set.

The apparatus 100 further includes a pawl 43 mechanically connected to the handcrank 11 for engaging each tooth 8 of the sawblade 102 to advance the blade one tooth at a time. The pawl 43 feeds and then releases the sawblade 102 as the handcrank 11 is turned, thereby selectively permitting the sawblade 102 to advance, by lifting up over each tooth 8 and dropping into the gullet of the next tooth 8. The handcrank 11 includes a handle 64.

The apparatus 100 further includes an upper crank arm 17 for engaging with the pawl 43 to move the pawl along the sawblade 102. The apparatus 100 further includes a lower crank arm 18 connected to the upper crank arm 17 and in communication with a rotating plate 16 for receiving rotation from the camshaft 28. Accordingly, as the handcrank 11 is rotated, the sawblade 102 advances through the apparatus 100 by action of the pawl 43.

The rotating plate 16 has a bolt hole therein (not shown) that is offset relative to centre so that the rotating plate 16 rotates like a crankshaft and converts the rotation of the handcrank 11 into linear movement at the pawl 45, thereby pushing on the sawblade 102 in order to advance the sawblade 102 through the apparatus 100.

The rotating plate 16 is shown as a disc or circular element but may be a square or other suitable shape.

In FIG. 3B, an alternate embodiment of the pawl 45 is shown. The pawl 45 slides back and forth along the X axis perpendicular to the length of the sawblade 102. As the pawl 45 slides further in the X+ or X− directions, more material is taken off the face of the tooth 8 over which the pawl 45 slides, via grinding.

The pattern 47 is adjusted in the X plus or X minus direction to remove less or more off the face of the tooth 8 by the adjusting screw 67.

In an embodiment, the pawl 43 or the pawl 45 is configured to be adjustable.

Advantageously, the shaping or setting functionality of the dies 22 and the sharpening provided by the grinding wheel 72 respectively sharpen and set the teeth (e.g., in a raker pattern) in a single pass of the sawblade through the apparatus 100.

The top arm 68 is connected to a feed lever 37 that pivots about a feed lever pivot pin 182. The feed lever 37 is further connected to a feed arm 133 via a link 38.

The apparatus 100 further includes a bearing housing 4.

The apparatus 100 further includes a position indicator 53 for indicating a position of the sawblade 102.

The apparatus 100 further includes a tracer wheel 78 for enabling tracing out the pattern 47 when grinding and setting the teeth 8 of the sawblade 102.

Figure 4:
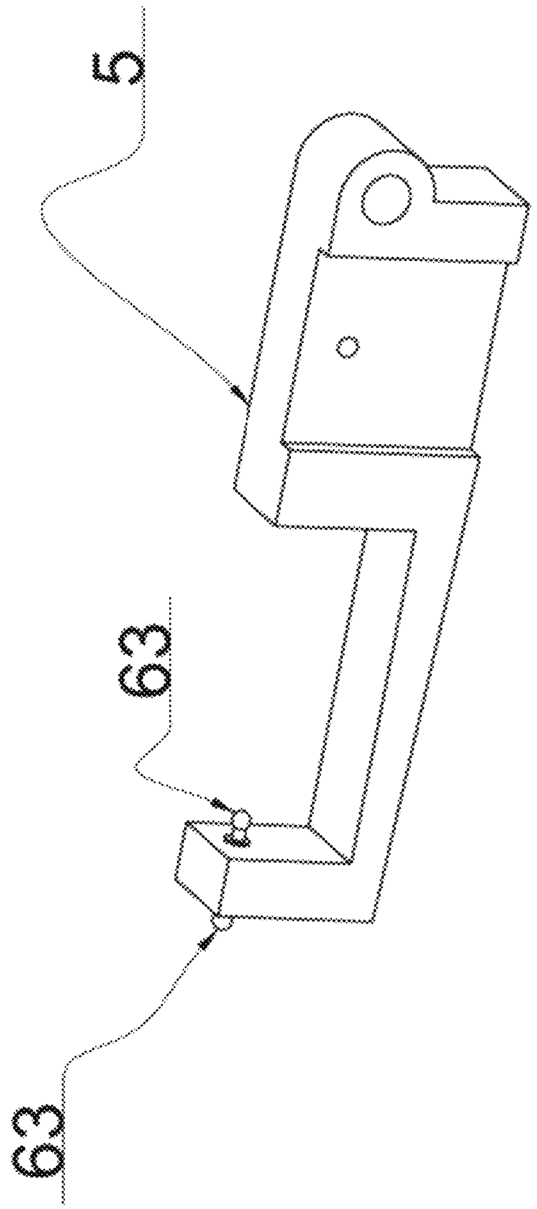
FIG. 4 is a perspective view of a tracer arm of the apparatus of FIGS. 1A-1D shown in greater detail.

Referring now to FIG. 4, shown therein is a perspective view of the tracer arm 5 of the apparatus 100 in greater detail. In particular, the double-ended stylus 63 may be seen disposed within the tracer arm 5.

Figure 5A:
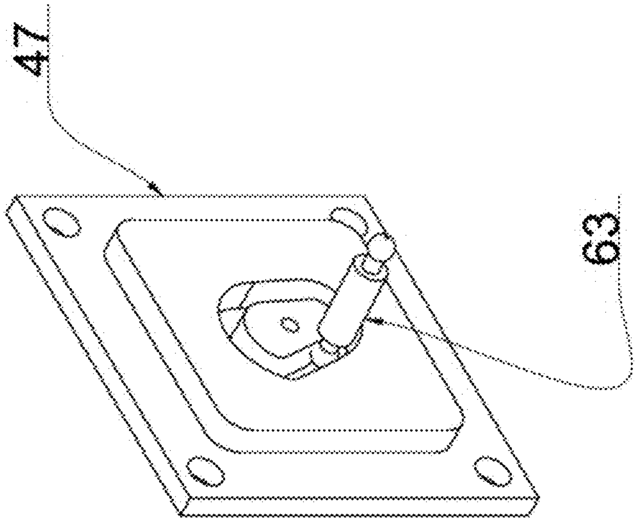
FIGS. 5A and 5B are perspective views of the pattern to which one end of the double-ended stylus 63 is attached.
Figure 5B:
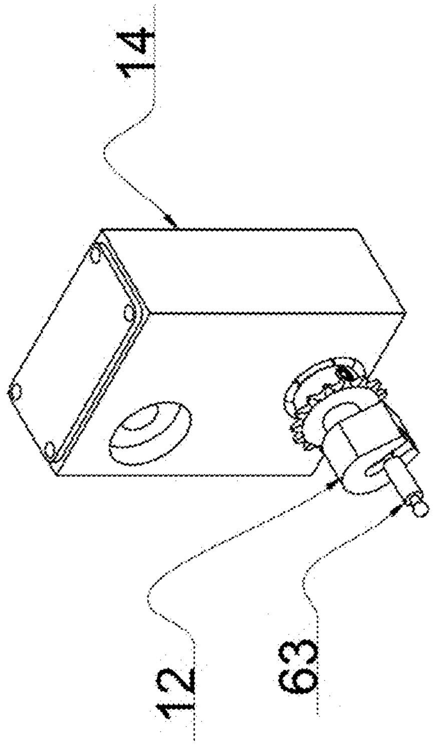

Referring now to FIGS. 5A and 5B, shown therein are perspective views of the pattern 47 to which one end of the double-ended stylus 63 is attached. In FIG. 5B, the pattern 47 is disposed within the housing 14.

The pattern 47 may be customized to any desired customized profile to be ground and/or offset into the teeth 8, e.g., the pattern 47 may be customized in advance and fitted onto the apparatus 100, the pattern 47 being replaceable with a different pattern as desired.

In an embodiment, the angles to be ground into the teeth 8 vary from 4-12 degrees on the actual tooth 8 with the upper portion of the tooth having angles of 32-37 degrees according to a type of wood to be cut.

In FIG. 5B, the radially slotted arm 12 is shown for engaging with the double-ended stylus 63.

Referring now to FIGS. 6A and 6B, shown therein are side and front views, respectively, of the sawblade 102 to be received, ground, and set by the apparatus 100. It will be appreciated that what is shown in FIGS. 6A and 6B may be only a section of a larger sawblade 102.

In an embodiment, the sawblade 102 is a ⅞ inch pitch blade, i.e., having a distance of approximately 1.250 inches between the teeth 8 represented as a pitch 80.

The sawblade 102 may have a height of approximately 1¼ inches, e.g., 1.248 inches.

The sawblade may have a width of 0.048 inches. The sawblade may have a set of 0.029 inches.

Each tooth 8 (of which only one instance is labelled in FIGS. 6A, 6B for clarity) includes a face 82 and a back 84. Between each teeth is disposed a gullet 86, forming the lowest point between adjacent teeth 8. The gullet 86 may be considered part of a preceding tooth 8 or of a succeeding tooth 8.

Referring now to FIG. 7, shown therein is a perspective view of a portion of the apparatus 100 for receiving input.

The apparatus 100 includes a handwheel 51 in communication with the input shaft 10 through a keyway in the bore (not shown) of the handwheel 51 and a keyway (not shown) on the input shaft 10. The handwheel has a square drive on the end that engages with a driven pulley 35 that, when the handwheel 51 is pushed in the Y+ direction, allows the input shaft 10 to be turned by the drive motor 56 via a belt 88. When the handwheel 51 is positioned "out" with respect to the input shaft 10, the handwheel 51 is suitable for manual operation. When the handwheel 51 is positioned "in" with respect to the input shaft 10, the handwheel 51 is suitable for automatic operation. The driven pully is 35 mounted on a bearing (see bearing 93 of FIG. 1E) on the input shaft 10 so that the driven pully 35 is only connected to the input shaft 10 when the handwheel 51 is positioned "in".

Figure 8:
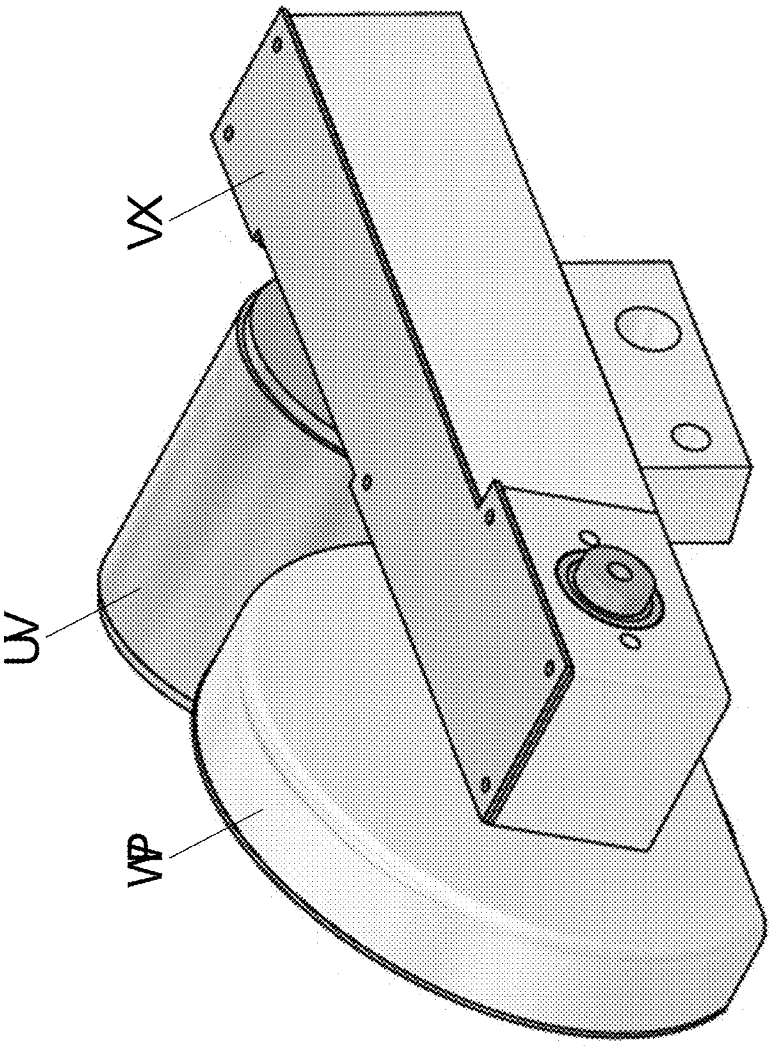
FIG. 8 is a perspective view of a grinding head of the apparatus of FIGS. 1A-1D shown in greater detail.

Referring now to FIG. 8, shown therein is a perspective view of the grinding head 70 of the apparatus 100 in further detail.

Figure 9:
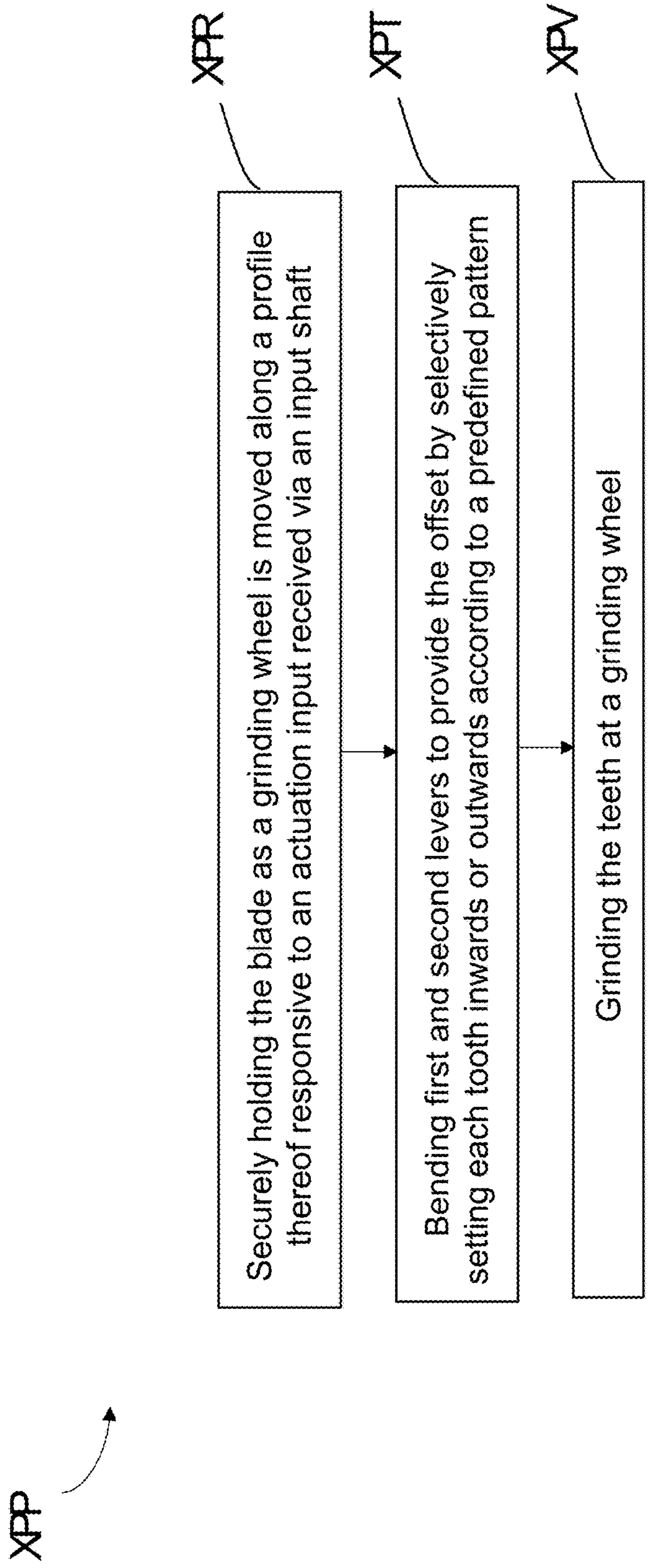
FIG. 9 is a flowchart of a method of grinding a blade comprising a plurality of teeth and setting the blade by providing an offset to the plurality of teeth, according to an embodiment.

Referring now to FIG. 9, shown therein is a flowchart of a method 800 of grinding a blade comprising a plurality of teeth and setting the blade by providing an offset to the plurality of teeth, according to an embodiment.

At 802, the method 800 includes securely holding the blade as a grinding wheel is moved along a profile thereof responsive to an actuation input received via an input shaft.

At 804, the method 800 includes respectively bending, via first and second banding cams actuated by a camshaft, first and second levers configured to pivot about respective pivot points to provide the offset by selectively setting each tooth inwards or outwards according to a predefined pattern.

Selectively setting each tooth inwards or outwards according to a predefined pattern may include not setting some teeth according to the predefined pattern.

At 806, the method 800 includes grinding the teeth at a grinding wheel.

Figure 10:
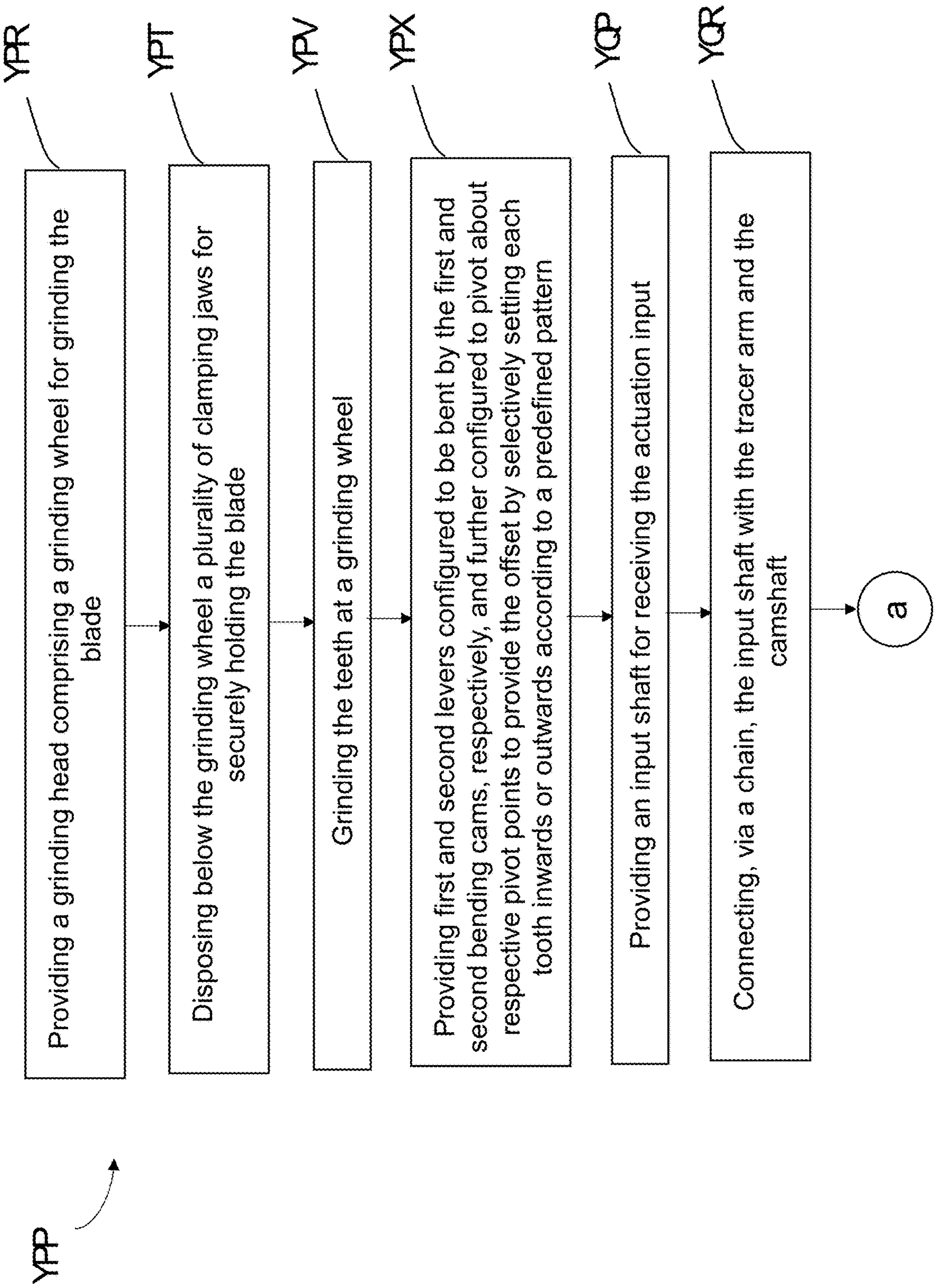
FIGS. 10-12 are a flowchart of a method of assembling an apparatus for grinding a blade comprising a plurality of teeth and for setting the blade by providing an offset to the plurality of teeth, according to an embodiment.
Figure 11:
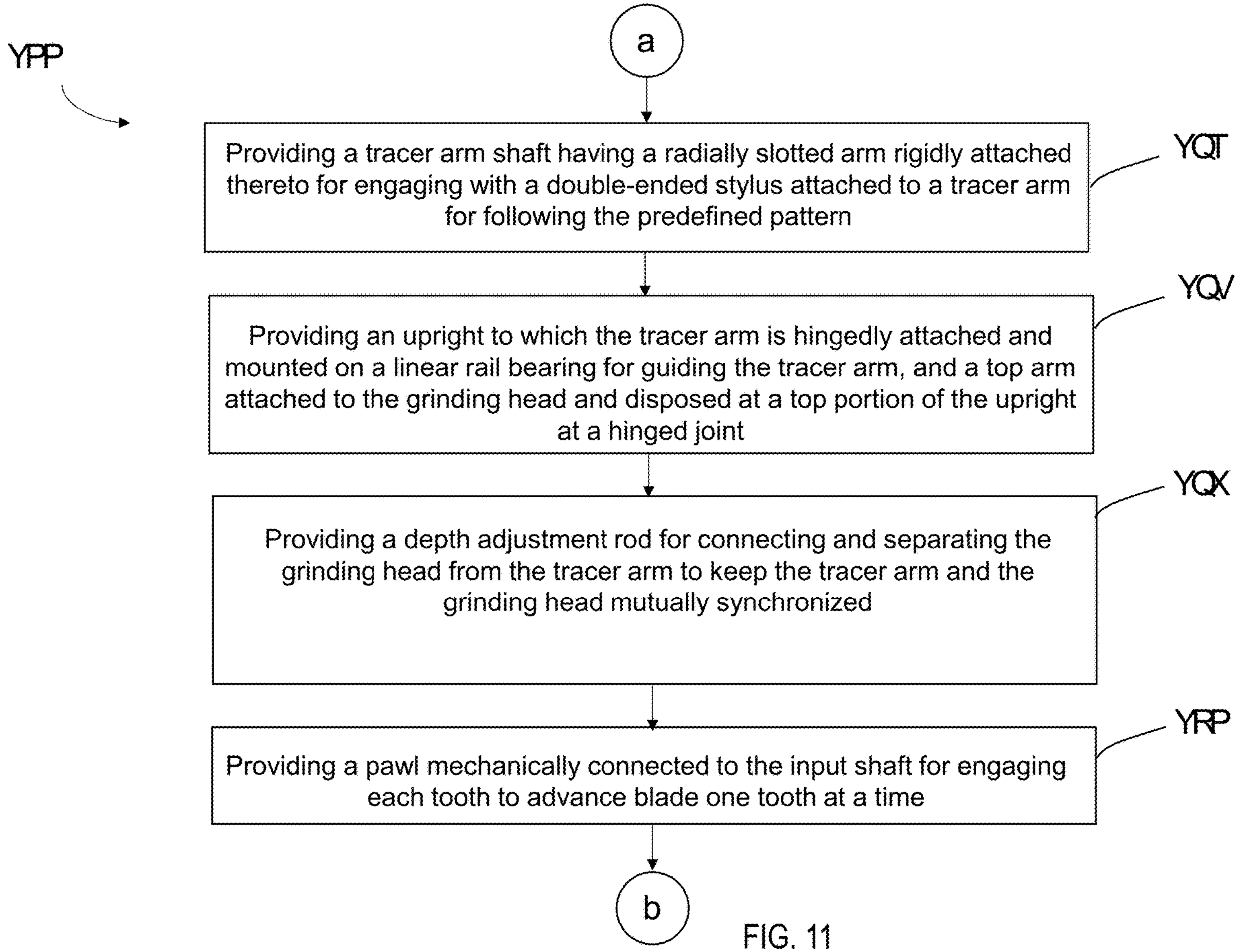
Figure 12:
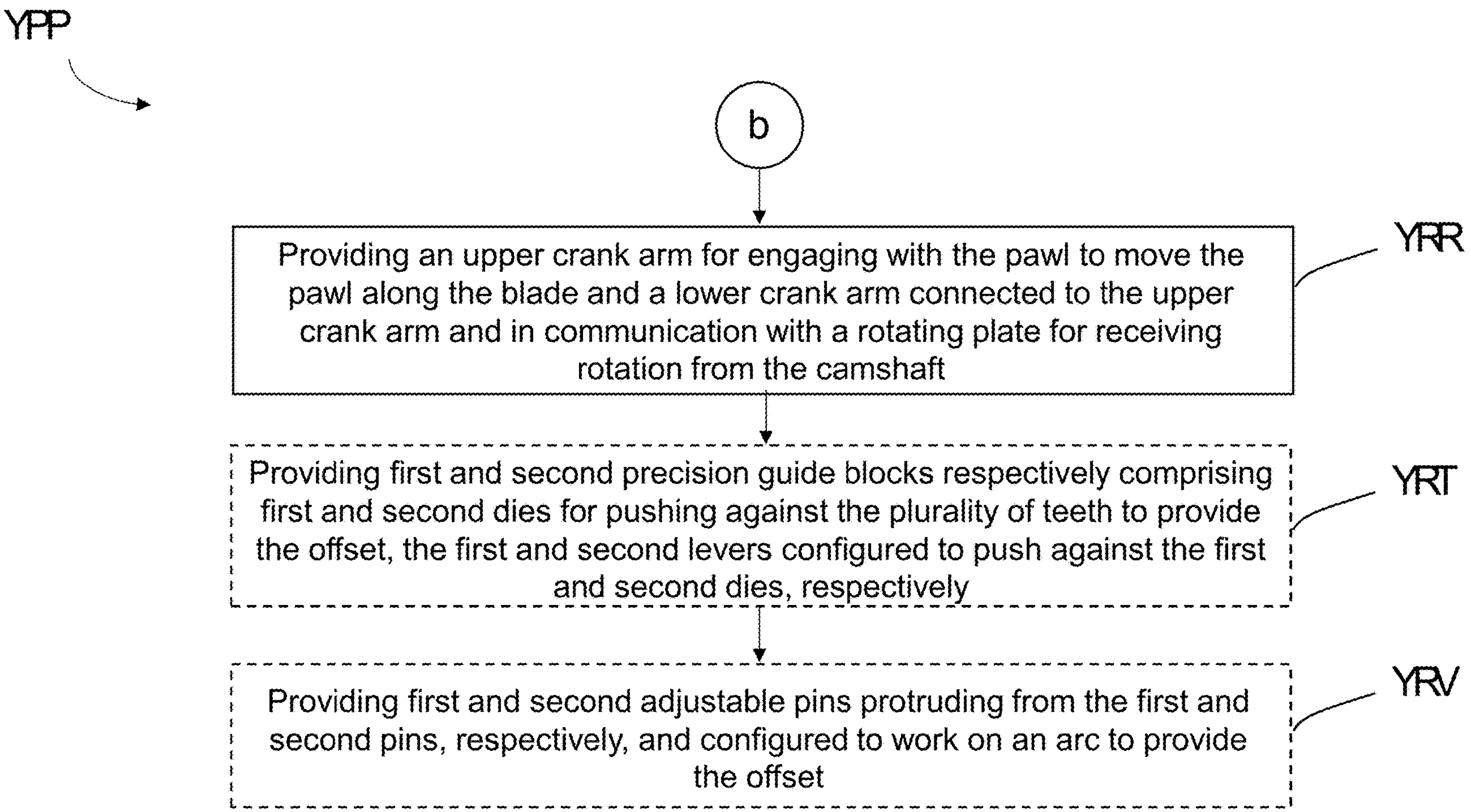

Referring now to FIGS. 10-12, shown therein is a flowchart of a method 900 of assembling an apparatus for grinding a blade comprising a plurality of teeth and for setting the blade by providing an offset to the plurality of teeth, according to an embodiment.

At 902, the method 900 includes providing a grinding head comprising a grinding wheel for grinding the blade.

At 904, the method 900 includes disposing below the grinding wheel a plurality of clamping jaws for securely holding the blade as the grinding wheel is moved along a profile thereof responsive to an actuation input.

At 906, the method 900 includes providing first and second bending cams configured to be actuated by a camshaft.

At 908, the method 900 includes providing first and second levers configured to be bent by the first and second bending cams, respectively, and further configured to pivot about respective pivot points to provide the offset by selectively setting each tooth inwards or outwards according to a predefined pattern.

Selectively setting each tooth inwards or outwards according to a predefined pattern may include not setting some teeth according to the predefined pattern.

At 910, the method 900 includes providing an input shaft for receiving the actuation input, the input shaft comprising a roller chain sprocket, a camshaft for actuating the first and second bending cams, the camshaft comprising a camshaft sprocket, and a tracer arm comprising a tracer sprocket.

At 912, the method 900 includes connecting, via a chain, the input shaft at the roller chain sprocket with the tracer arm at the tracer sprocket and the camshaft at the camshaft sprocket thereof, the roller chain sprocket configured, upon receiving the actuation input via the input shaft, to drive the tracer arm and the camshaft;

At 914, the method 900 includes providing a tracer arm shaft for enabling tracing out the predefined pattern by communicating with the pattern, wherein the tracer arm shaft has a radially slotted arm rigidly attached thereto for engaging with a double-ended stylus, wherein the double-ended stylus is attached to the tracer arm for following the predefined pattern including tracing out the pattern with the opposite end of the stylus.

At 916, the method 900 includes providing an upright to which the tracer arm is hingedly attached, the upright mounted on a linear rail bearing for guiding movement of the tracer arm, and a top arm attached to the grinding head and disposed at a top portion of the upright at a hinged joint, wherein as the tracer arm follows the predefined pattern, the top arm is configured to follow the predefined pattern.

At 918, the method 900 includes providing a depth adjustment rod for connecting and separating the grinding head from the tracer arm to keep the tracer arm and the grinding head mutually synchronized.

At 920, the method 900 includes providing a pawl mechanically connected to the input shaft for engaging each tooth to advance the blade one tooth at a time, the pawl configured to feed and release the blade as the input shaft receives the actuation input, thereby selectively permitting the blade to advance through the apparatus by lifting up over each tooth and dropping into a gullet of a subsequent tooth.

At 922, the method 900 includes providing an upper crank arm for engaging with the pawl to move the pawl along the blade and a lower crank arm connected to the upper crank arm and in communication with a rotating plate for receiving rotation from the camshaft.

At 924, the method 900 optionally includes providing first and second precision guide blocks respectively comprising first and second dies for pushing against the plurality of teeth to provide the offset, wherein the first and second levers are configured to push against the first and second dies, respectively.

At 926, the method 900 optionally includes providing first and second adjustable pins protruding from the first and second pins, respectively, and configured to work on an arc to provide the offset.

In an embodiment, the method 900 includes 924 or 926.

While the above description provides examples of one or more apparatus, methods, or systems, it will be appreciated that other apparatus, methods, or systems may be within the scope of the claims as interpreted by one of skill in the art.

The invention claimed is:

1. An apparatus for grinding a blade comprising a plurality of teeth and setting the blade by providing an offset to the plurality of teeth, the apparatus comprising:

a grinding wheel for grinding the blade;

a plurality of clamping jaws for securely holding the blade as the grinding wheel is moved along a profile thereof responsive to an actuation input;

an input shaft for receiving the actuation input;

first and second bending cams configured to be actuated by a camshaft; and first and second levers configured to be pivoted by the first and second bending cams, respectively, about respective pivot points to provide the offset by selectively setting each tooth inwards or outwards or leaving the tooth in place according to a setting pattern;

a pawl mechanically connected to the input shaft for engaging each tooth to advance the blade one tooth at a time, the pawl configured to feed and release the blade as the input shaft receives the actuation input, thereby selectively permitting the blade to advance through the apparatus by lifting up over each tooth and dropping into a gullet of a subsequent tooth;

an upper crank arm for engaging with the pawl to move the pawl along the blade, a lower crank arm connected to the upper crank arm and in communication with a rotating plate for receiving rotation from the camshaft; and a tracer arm shaft for enabling tracing out a predefined grinding pattern by communicating with the pattern, wherein the tracer arm shaft has a radially slotted arm rigidly attached thereto for engaging with a double-ended stylus, wherein the double-ended stylus is attached to a tracer arm for following the predefined grinding pattern including tracing out the predefined grinding pattern with the opposite end of the stylus.

2. The apparatus of claim 1 further including an upright to which the tracer arm is hingedly attached mounted on a linear rail bearing for guiding movement of the tracer arm, and a top arm attached to a grinding head housing the grinding wheel and disposed at a top portion of the upright at a hinged joint, wherein as the tracer arm follows the predefined grinding pattern, the top arm is configured to follow the predefined grinding pattern.

3. The apparatus of claim 2 further comprising a chain for connecting the input shaft, at a roller chain sprocket thereof, the tracer arm, at a tracer sprocket thereof, and the camshaft, at a camshaft sprocket thereof, the roller chain sprocket configured, upon receiving the actuation input via the input shaft, to drive the tracer arm and the camshaft, wherein the apparatus further comprises a depth adjustment rod for connecting and separating the grinding head from the tracer arm to keep the tracer arm and the grinding head mutually synchronized.

4. The apparatus of claim 1 further comprising first and second precision guide blocks respectively comprising first and second dies for pushing against the plurality of teeth to provide the offset, wherein the first and second levers are configured to push against the first and second dies, respectively.

5. The apparatus of claim 1, wherein the first and second levers respectively comprise first and second adjustable pins protruding therefrom and configured to work on an arc to provide the offset.

6. The apparatus of claim 1, wherein the apparatus first grinds each tooth and then sets the ground tooth according to the setting pattern.

7. The apparatus of claim 1, wherein the setting pattern instructs, for every group of three teeth of the plurality of teeth, to set the first tooth inwards, to set the second tooth outwards, and not to set the third tooth.

8. A method of grinding a blade comprising a plurality of teeth and setting the blade by providing an offset to the plurality of teeth, the method comprising:

securely holding the blade as a grinding wheel is moved along a profile thereof responsive to an actuation input received via an input shaft to grind the teeth at the grinding wheel;

respectively pivoting, via first and second bending cams actuated by a camshaft, first and second levers about respective pivot points to provide the offset by selectively setting each tooth inwards or outwards or leaving the tooth in place according to a setting pattern;

engaging each tooth, at a pawl mechanically connected to the input shaft, to advance the blade one tooth at a time, the pawl configured to feed and release the blade as the input shaft receives the actuation input, thereby selectively permitting the blade to advance by lifting up over each tooth and dropping into a gullet of a subsequent tooth;

engaging with the pawl, at an upper crank arm, to move the pawl along the blade, wherein the upper crank arm is connected to a lower crank arm in communication with a rotating plate for receiving rotation from the camshaft; and enabling, at a tracer arm shaft, tracing out a predefined grinding pattern by communicating with the predefined grinding pattern, wherein the tracer arm shaft has a radially slotted arm rigidly attached thereto for engaging with a double-ended stylus, wherein the double-ended stylus is attached to a tracer arm for following the predefined grinding pattern including tracing out the predefined grinding pattern with the opposite end of the stylus.

9. The method of claim 8, wherein the tracer arm is hingedly attached to an upright mounted on a linear rail bearing for guiding movement of the tracer arm, wherein as the tracer arm follows the predefined grinding pattern, a top arm is configured to follow the predefined grinding pattern, the top arm attached to a grinding head housing the grinding wheel and disposed at a top portion of the upright at a hinged joint.

10. The method of claim 9, wherein the input shaft is connected via a chain, at a roller chain sprocket of the input shaft, to the tracer arm, at a tracer sprocket thereof, and to the camshaft, at a camshaft sprocket thereof, the roller chain sprocket configured, upon receiving the actuation input via the input shaft, to drive the tracer arm and the grinding head, wherein the tracer arm and the grinding head are mutually synchronized via a depth adjustment rod for connecting and separating the grinding head from the tracer arm.

11. The method of claim 8 further comprising pushing against the plurality of teeth to provide the offset, wherein the pushing occurs via first and second precision guide blocks respectively comprising first and second dies, and wherein the first and second levers are configured to push against the first and second dies, respectively.

12. The method of claim 8, wherein the first and second levers respectively comprise first and second adjustable pins protruding therefrom and configured to work on an arc to provide the offset.

13. The method of claim 8, wherein grinding the teeth occurs prior to providing the offset.

14. The method of claim 8, wherein the setting pattern instructs, for every group of three teeth of the plurality of teeth, to set the first tooth inwards, to set the second tooth outwards, and not to set the third tooth.

15. A method of assembling an apparatus for grinding a blade comprising a plurality of teeth and for setting the blade by providing an offset to the plurality of teeth, the method comprising:

providing a grinding head comprising a grinding wheel for grinding the blade;

disposing below the grinding wheel a plurality of clamping jaws for securely holding the blade as the grinding wheel is moved along a profile thereof responsive to an actuation input;

providing first and second bending cams configured to be actuated by a camshaft;

providing first and second levers configured to be pivoted by the first and second bending cams, respectively, about respective pivot points to provide the offset by selectively setting each tooth inwards or outwards or leaving the tooth in place according to a setting pattern;

providing an input shaft for receiving the actuation input, the input shaft comprising a roller chain sprocket, a camshaft for actuating the first and second bending cams, the camshaft comprising a camshaft sprocket, and a tracer arm comprising a tracer sprocket;

connecting, via a chain, the input shaft at the roller chain sprocket with the tracer arm at the tracer sprocket and the camshaft at the camshaft sprocket thereof, the roller chain sprocket configured, upon receiving the actuation input via the input shaft, to drive the tracer arm and the camshaft;

providing a tracer arm shaft for enabling tracing out a predefined grinding pattern by communicating with the predefined grinding pattern, wherein the tracer arm shaft has a radially slotted arm rigidly attached thereto for engaging with a double-ended stylus, wherein the double-ended stylus is attached to a tracer arm for following the predefined grinding pattern including tracing out the predefined grinding pattern with the opposite end of the stylus;

providing an upright to which the tracer arm is hingedly attached, the upright mounted on a linear rail bearing for guiding movement of the tracer arm, and a top arm attached to the grinding head and disposed at a top portion of the upright at a hinged joint, wherein as the tracer arm follows the predefined grinding pattern, the top arm is configured to follow the predefined grinding pattern;

providing a depth adjustment rod for connecting and separating the grinding head from the tracer arm to keep the tracer arm and the grinding head mutually synchronized;

providing a pawl mechanically connected to the input shaft for engaging each tooth to advance the blade one tooth at a time, the pawl configured to feed and release the blade as the input shaft receives the actuation input, thereby selectively permitting the blade to advance through the apparatus by lifting up over each tooth and dropping into a gullet of a subsequent tooth;

providing an upper crank arm for engaging with the pawl to move the pawl along the blade and a lower crank arm connected to the upper crank arm and in communication with a rotating plate for receiving rotation from the camshaft; and providing:

first and second precision guide blocks respectively comprising first and second dies for pushing against the plurality of teeth to provide the offset, wherein the first and second levers are configured to push against the first and second dies, respectively;

or:

providing first and second adjustable pins protruding from the first and second levers, respectively, and configured to work on an arc to provide the offset.

* * * * *